US012760693B2

(12) United States Patent

Fujii et al.

(10) Patent No.: US 12,760,693 B2

(45) Date of Patent: Oct. 13, 2026

(54) METHOD FOR CONTROLLING ENGINE AND ENGINE CONTROL APPARATUS

(71) Applicant: Mazda Motor Corporation, Hiroshima (JP)

(72) Inventors: Takuma Fujii, Aki-gun (JP); Mitsuhiro Muto, Aki-gun (JP); Keisuke Okihama, Aki-gun (JP); Ryohei Matsuo, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/012,728

(22) Filed: Jan. 7, 2025

(65) Prior Publication Data

US 2025/0230777 A1 Jul. 17, 2025

(30) Foreign Application Priority Data

Jan. 12, 2024 (JP) ................................ 2024-003591

(51) Int. Cl.

*F02D 41/40* (2006.01)
*F02D 41/38* (2006.01)
*F02P 5/15* (2006.01)

(52) U.S. Cl.

CPC .......... *F02D 41/401* (2013.01); *F02P 5/1502* (2013.01); *F02D 2041/389* (2013.01)

(58) Field of Classification Search

CPC . F02D 2041/389; F02D 41/401; F02P 5/1502
See application file for complete search history.

(56) References Cited

U.S. PATENT DOCUMENTS

2004/0163623 A1 * 8/2004 Fukusako ............... F02D 13/06 123/406.33
2019/0017461 A1 1/2019 Mukaihara et al.
2020/0032736 A1 * 1/2020 Masuda ................ F02D 41/307
2020/0095949 A1 * 3/2020 Wakimoto .......... G06F 16/9017

FOREIGN PATENT DOCUMENTS

JP 2000-045922 A 2/2000
JP 2009-047014 A 3/2009
JP 2018-155171 A 10/2018
WO 2017/135038 A1 8/2017

* cited by examiner

*Primary Examiner* — Kevin A Lathers

(74) *Attorney, Agent, or Firm* — XSENSUS LLP

(57) ABSTRACT

A method for controlling an engine includes selecting a control point consisting of a combination of an injection timing of injecting fuel and an ignition timing of igniting an air-fuel mixture, corresponding to a selection on a parameter map $M_{lim}$ having the injection timing as a first axis and the ignition timing as a second axis, defines a parameter region $R_{lim}$ surrounded by a first limit line Li1 indicating an advance limit at which preignition is restrained, a second limit line Li2 indicating an advance limit at which smoke is restrained, a third limit line Li3 indicating an advance limit at which knocking is restrained, and a fourth limit line Li4 indicating a retard limit at which combustion stability is ensured on the parameter map $M_{lim}$, and further includes a step of selecting the control point so the ignition timing is brought to maximum advance within the parameter region $R_{lim}$.

12 Claims, 18 Drawing Sheets

METHOD FOR CONTROLLING ENGINE AND ENGINE CONTROL APPARATUS

CROSS-REFERENCE TO RELATED APPLICATION

This application is based on Japanese patent application No. 2024-003591, filed Jan. 12, 2024, the content of which is incorporated hereinto by reference.

TECHNICAL FIELD

The present disclosure relates to a method for controlling an engine.

BACKGROUND ART

Patent Literature 1 discloses a control device for a diesel engine. Specifically, the control device described in Patent Literature 1 is configured to expand or reduce a low-temperature premixed combustion region in accordance with the setting of a preignition limit, which is the limit of the fuel injection timing.

In addition, Patent Literature 2 discloses a control device for an internal combustion engine. Specifically, the control device described in Patent Literature 2 is configured to keep the timing at which the last fuel injection in one combustion cycle is finished (last injection timing) within a predetermined effective injection period.

In addition, Patent Literature 3 discloses another example of a control device for an internal combustion engine. Specifically, the control device described in Patent Literature 3 is configured to perform ignition timing feedback control to keep the ignition timing at a knocking limit at which weak knocking occurs.

In addition, Patent Literature 4 discloses a control device for a vehicle. Specifically, the control device described in Patent Literature 4 is configured to retard the ignition timing of a spark plug within a range on the advanced side relative to a predetermined retard limit. Here, the retard limit described in Patent Literature 4 means a limit value on the retarded side at which the combustion stability of the engine is ensured.

CITATION LIST

Patent Literature

[Patent Literature 1] Japanese Patent Laid-Open No. 2009-047014

[Patent Literature 2] International Publication No. WO 2017/135038

[Patent Literature 3] Japanese Patent Laid-Open No. 2000-045922

[Patent Literature 4] Japanese Patent Laid-Open No. 2018-155171

SUMMARY

Problems to be Solved

As described in Patent Literatures 1 to 4, it has long been known that the preignition limit, the knocking limit, the retard limit, and the like are taken into consideration in setting the fuel injection timing and the timing of igniting an air-fuel mixture.

However, these restrictions are specified from a viewpoint different from the fuel efficiency of the engine. Thus, there is still room for optimization of the fuel efficiency of the engine.

The present disclosure has been made in view of such a point, and an object thereof is to optimize the fuel efficiency of an engine while taking into consideration various restrictions imposed on the engine.

Means for Addressing Problems to be Solved

A first aspect of the present disclosure relates to a method for controlling an engine using a cylinder, an injector that injects fuel into the cylinder, a spark plug that ignites an air-fuel mixture containing the fuel injected from the injector, and a controller that is electrically connected to the injector and the spark plug and controls each of the injector and the spark plug. This control method includes a step in which the controller selects a control point consisting of a combination of an injection timing at which the injector injects the fuel and an ignition timing at which the spark plug ignites the air-fuel mixture, corresponding to a selection on a parameter map having the injection timing as a first axis and the ignition timing as a second axis, a plurality of limit lines are provided on the parameter map, each of the limit lines varying in accordance with an operating state of the engine, the plurality of limit lines include a first limit line indicating an advance limit at which preignition is restrained, a second limit line indicating an advance limit at which smoke is restrained, a third limit line indicating an advance limit at which knocking is restrained, and a fourth limit line indicating a retard limit at which combustion stability is ensured, and define a parameter region surrounded by the plurality of limit lines on the parameter map, and the method further includes a step in which the controller selects the control point so that the ignition timing is brought to maximum advance within a range of the parameter region.

According to the first aspect, by determining the combination of the injection timing and the above-mentioned ignition timing within the parameter region, it is possible to perform setting within the range of various restrictions when selecting the injection timing and the ignition timing.

Furthermore, by bringing the ignition timing to maxim advance within the parameter region, the fuel efficiency of the engine can be optimized while taking into consideration the various restrictions imposed on the engine.

In addition, according to a second aspect of the present disclosure, the method for controlling the engine may further include a step in which the controller shifts the control point onto any one of the limit lines constituting the parameter region when the control point falls outside the parameter region in response to a reduction of the parameter region, and then a step in which the controller shifts the control point in stages each time a combustion cycle is repeated so that the ignition timing is brought to maximum advance within a range of the parameter region after the reduction.

According to the second aspect, even when the control point falls outside the parameter region, by shifting the control point to any one of the limit lines, it is possible to respond to the restrictions imposed on the engine in a preferential manner. Then, each process can be performed in accordance with the desired order of priority by bringing the ignition timing to maximum advance in stages.

In addition, according to a third aspect of the present disclosure, the controller may execute the step of shifting the control point onto any one of the limit lines within one combustion cycle through feedforward control based on the operating state of the engine.

According to the third aspect, the control point is shifted to the limit line within one combustion cycle. This makes it possible to respond as quickly as possible to the restrictions imposed on the engine.

In addition, according to a fourth aspect of the present disclosure, the method for controlling the engine may further include a step in which the controller shifts the control point in stages each time a combustion cycle is repeated when the ignition timing is brought to non-maximum advance in response to an expansion of the parameter region so that the ignition timing is brought to maximum advance within a range of the parameter region after the expansion.

According to the fourth aspect, the ignition timing is brought to maximum advance in stages for each combustion cycle. By changing the ignition timing in stages, the ignition timing can be more reliably shifted to the maximum advance point.

In addition, according to a fifth aspect of the present disclosure, a piston may be housed in the cylinder, a cavity may be formed on an upper face of the piston, and the plurality of limit lines may further include a fifth limit line indicating an advance limit for allowing the fuel injected from the injector to reach inside of the cavity.

According to the fifth aspect, the advance limit for allowing the fuel injected from the injector to reach the inside of the cavity is adopted in the plurality of limit lines. This makes it possible to impose restrictions on the engine from a more multifaceted point of view. This is advantageous in improving the performance of the engine.

In addition, according to a sixth aspect of the present disclosure, the plurality of limit lines may further include a sixth limit line indicating an advance limit for allowing the fuel injected from the injector to reach the spark plug.

According to the sixth aspect, the advance limit for allowing the fuel injected from the injector to reach the spark plug is adopted in the plurality of limit lines. This makes it possible to impose restrictions on the engine from a more multifaceted point of view. This is advantageous in improving the performance of the engine.

In addition, according to a seventh aspect of the present disclosure, the fourth limit line may indicate a retard limit of the ignition timing.

According to the seventh aspect, the retard limit of the ignition timing is adopted in the plurality of limit lines. This makes it possible to impose restrictions from a more important point of view in the combustion control of the engine. This is advantageous in improving the performance of the engine.

Advantageous Effects

As described above, according to the present disclosure, it is possible to optimize the fuel efficiency of an engine while taking into consideration various restrictions imposed on the engine.

Figure 2:
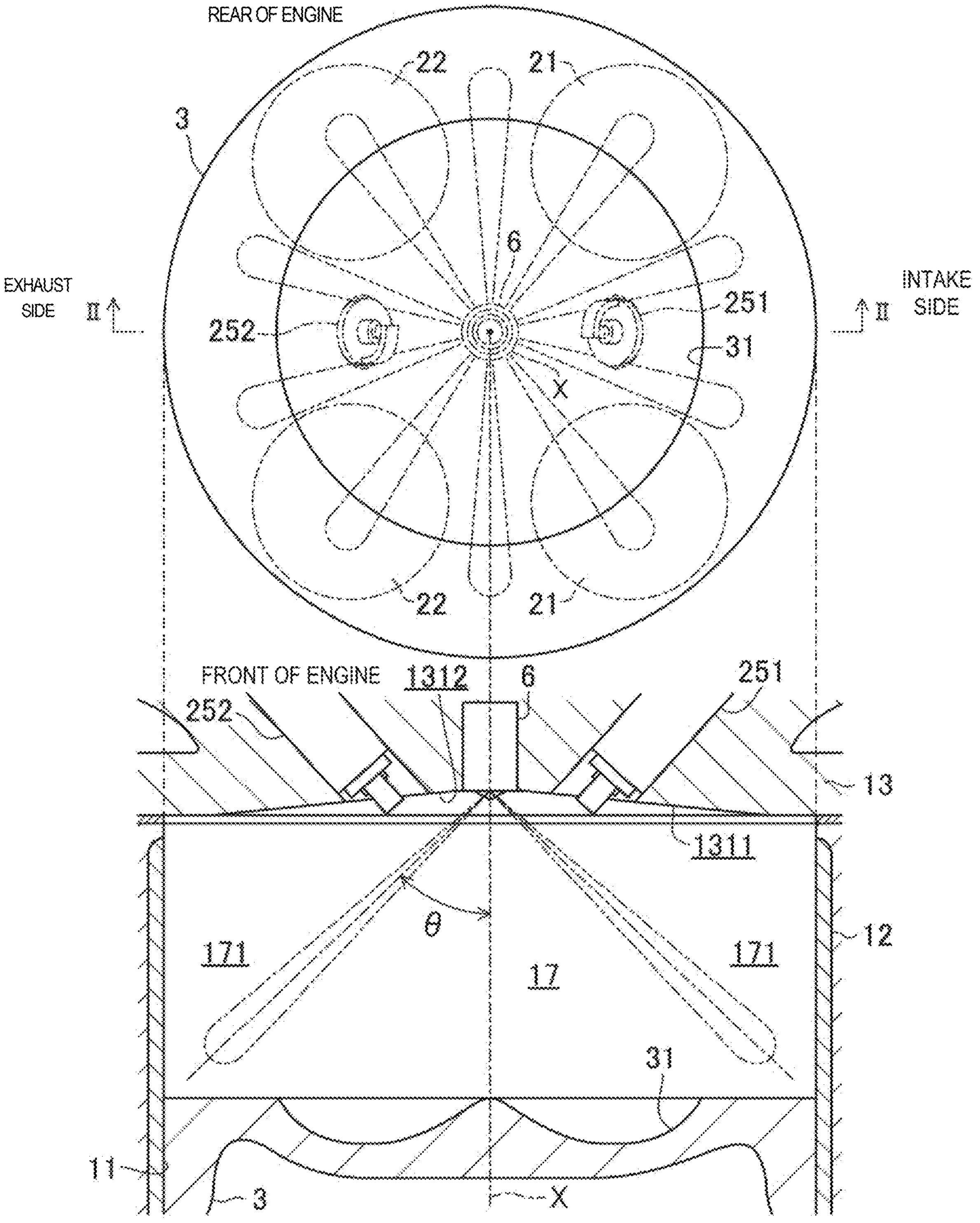

The upper drawing of FIG. 2 is a plan view illustrating the structure of a combustion chamber of an engine. The lower drawing is a II-II sectional view of the upper drawing, which is a diagram for describing a state in which fuel is injected into a cylinder at a middle stage of a compression stroke.

Figure 3:
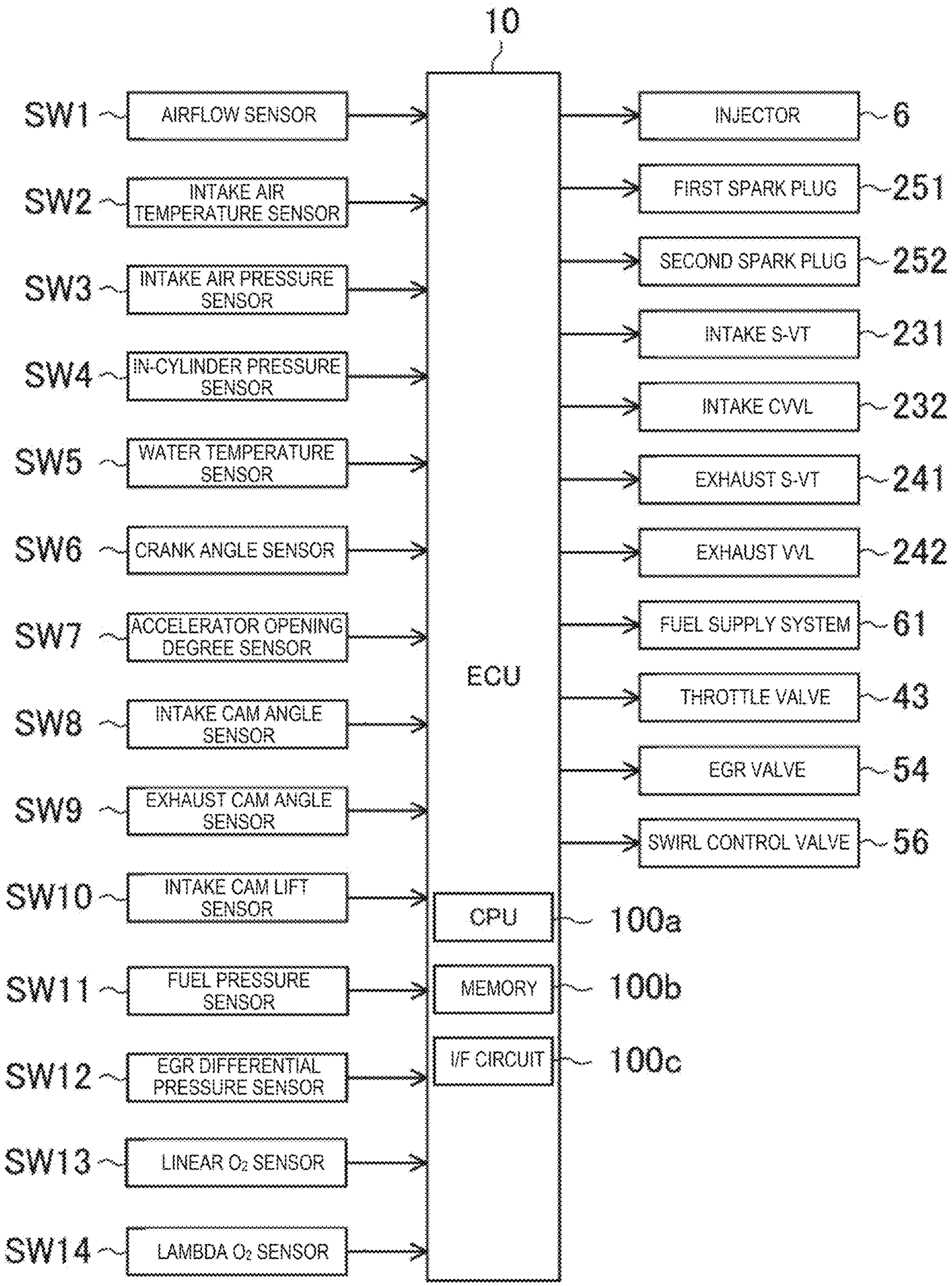

FIG. 3 is a block diagram of the engine system.

Figure 4:
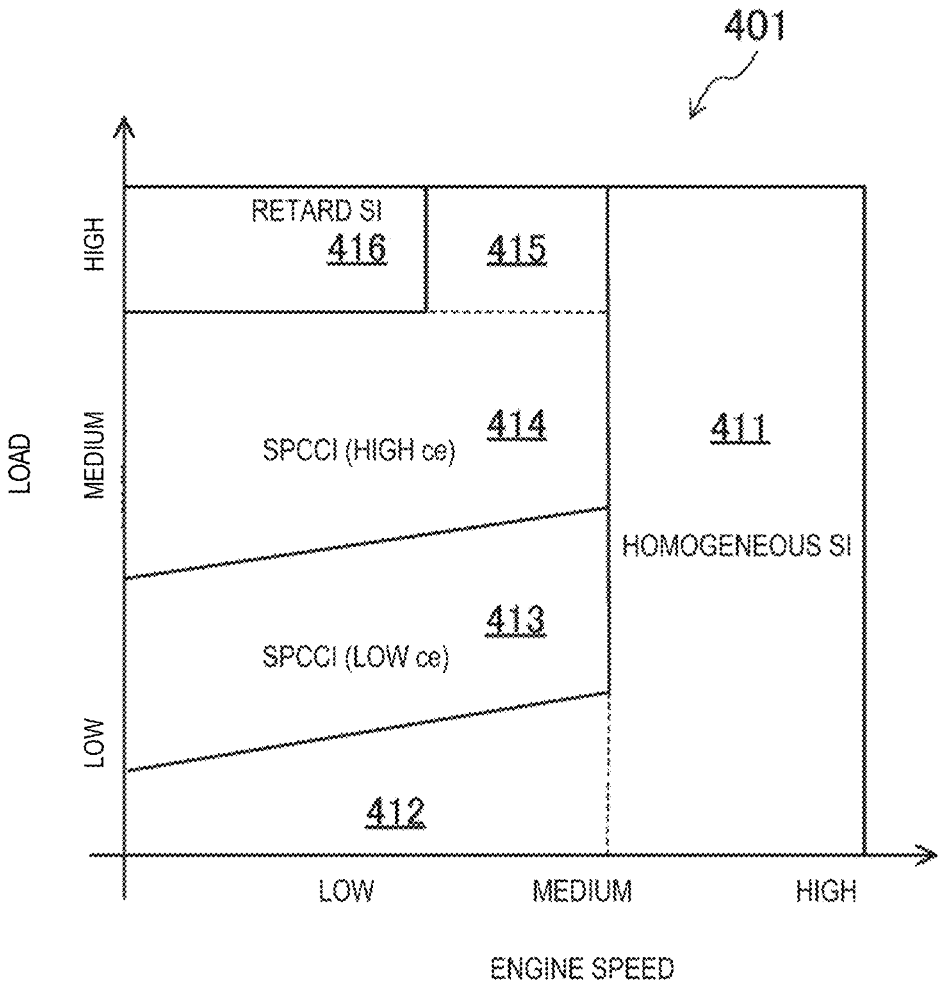

FIG. 4 is a diagram illustrating a base map related to the operation of the engine.

Figure 5:
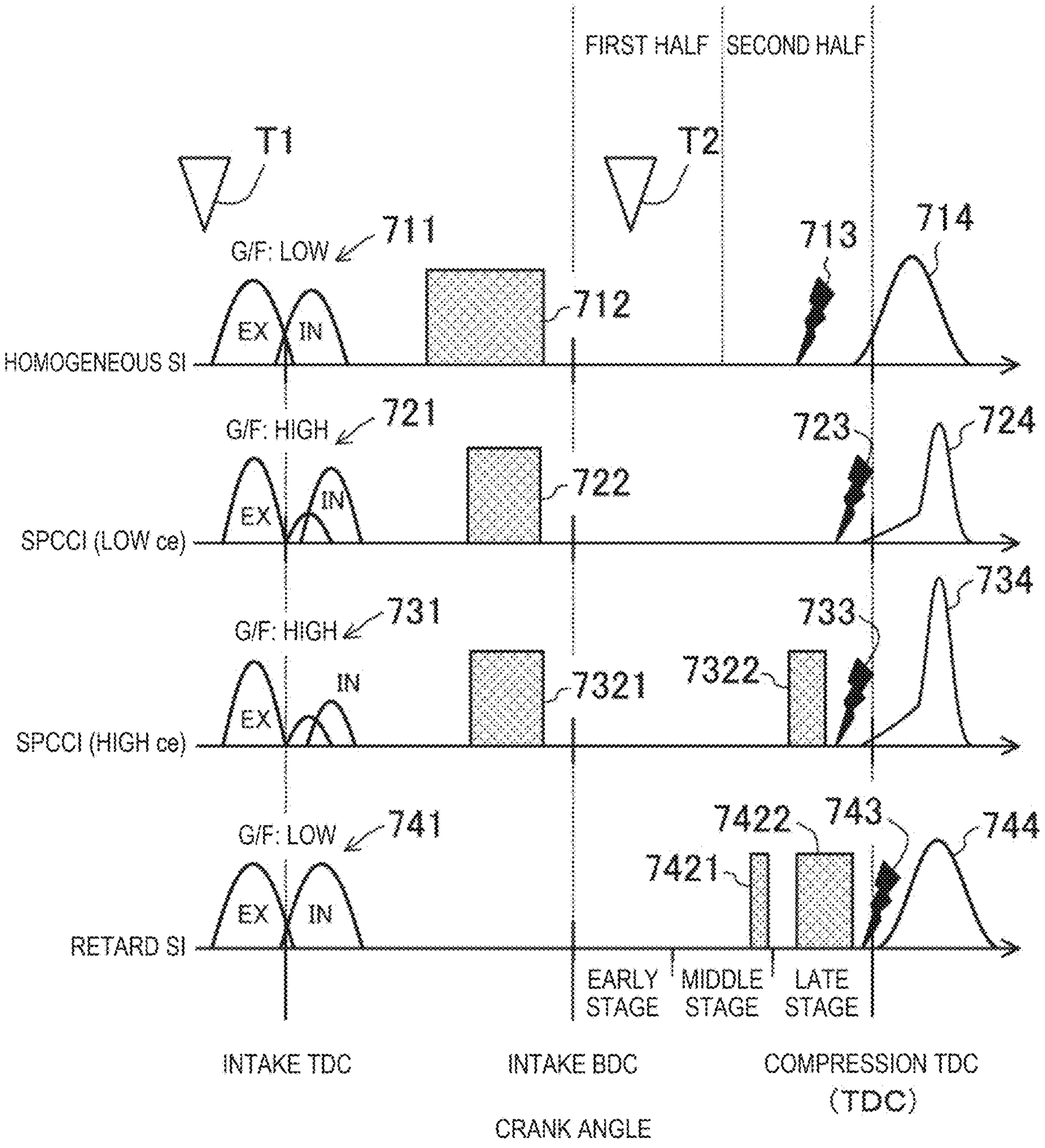

FIG. 5 is a diagram illustrating the opening and closing operation of an intake valve and an exhaust valve, a fuel injection timing, and an ignition timing in each combustion mode.

Figure 6:
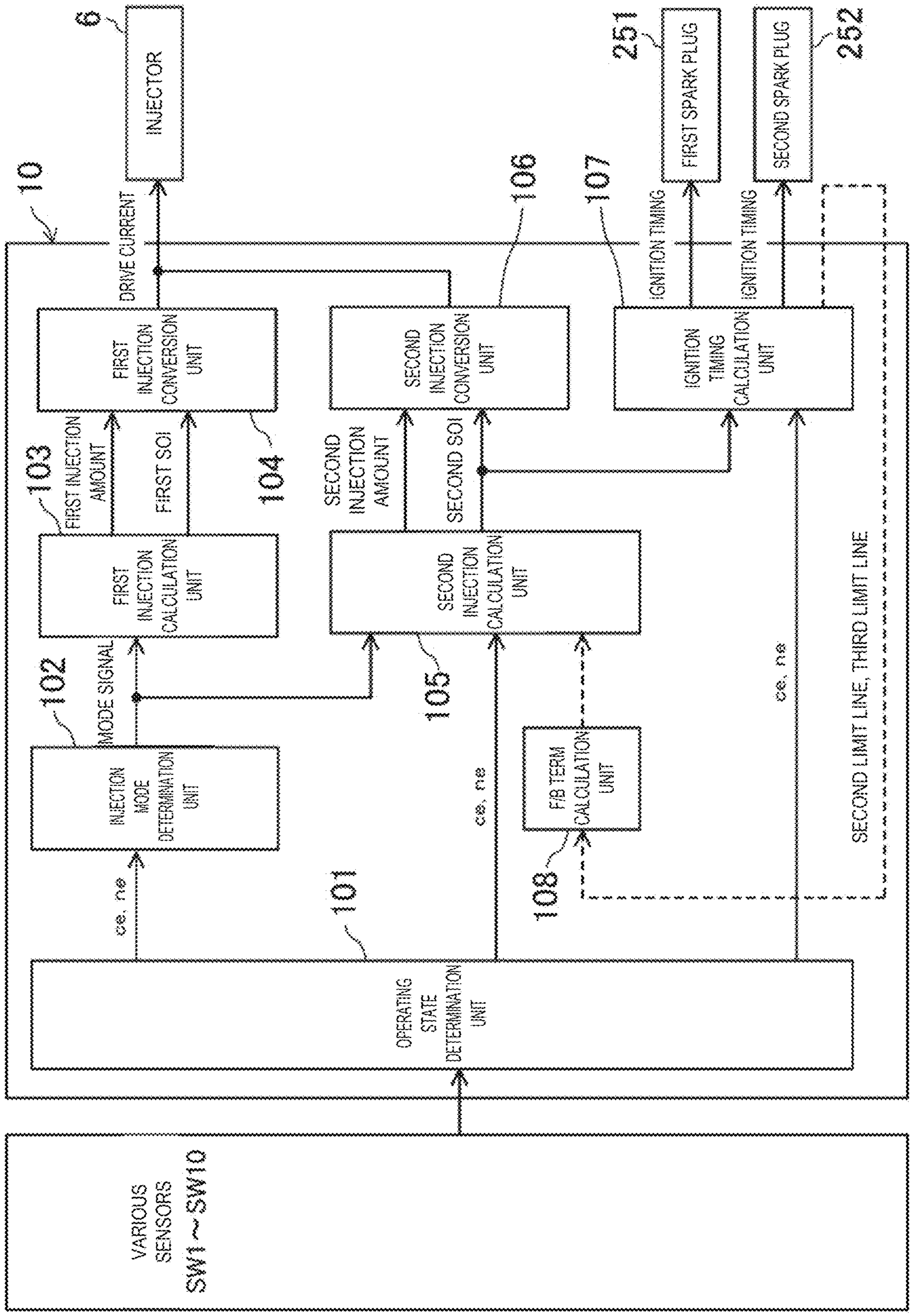

FIG. 6 is a block diagram illustrating the configuration of a control device for the engine.

Figure 7:
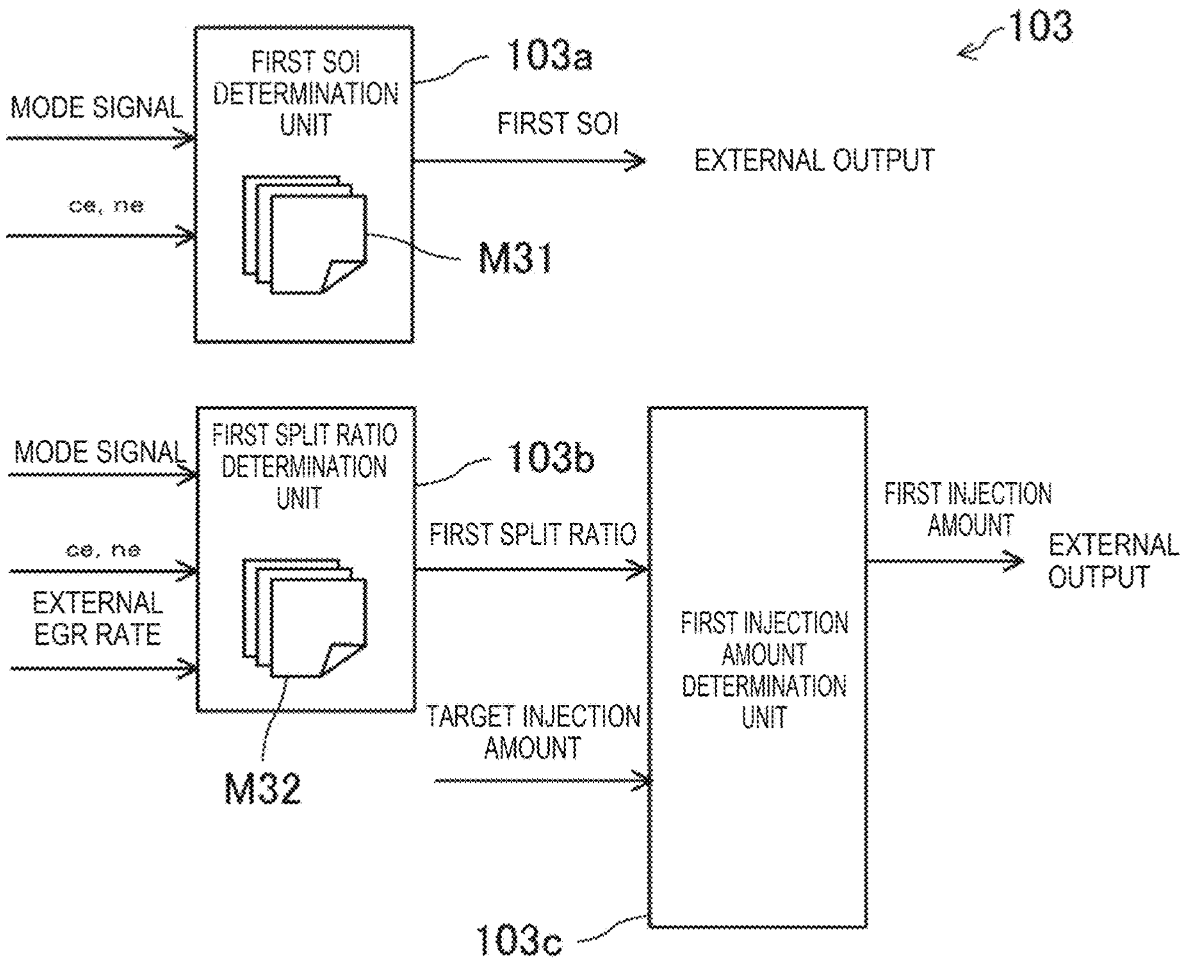

FIG. 7 is a block diagram illustrating the configuration of a first injection calculation unit.

Figure 8:
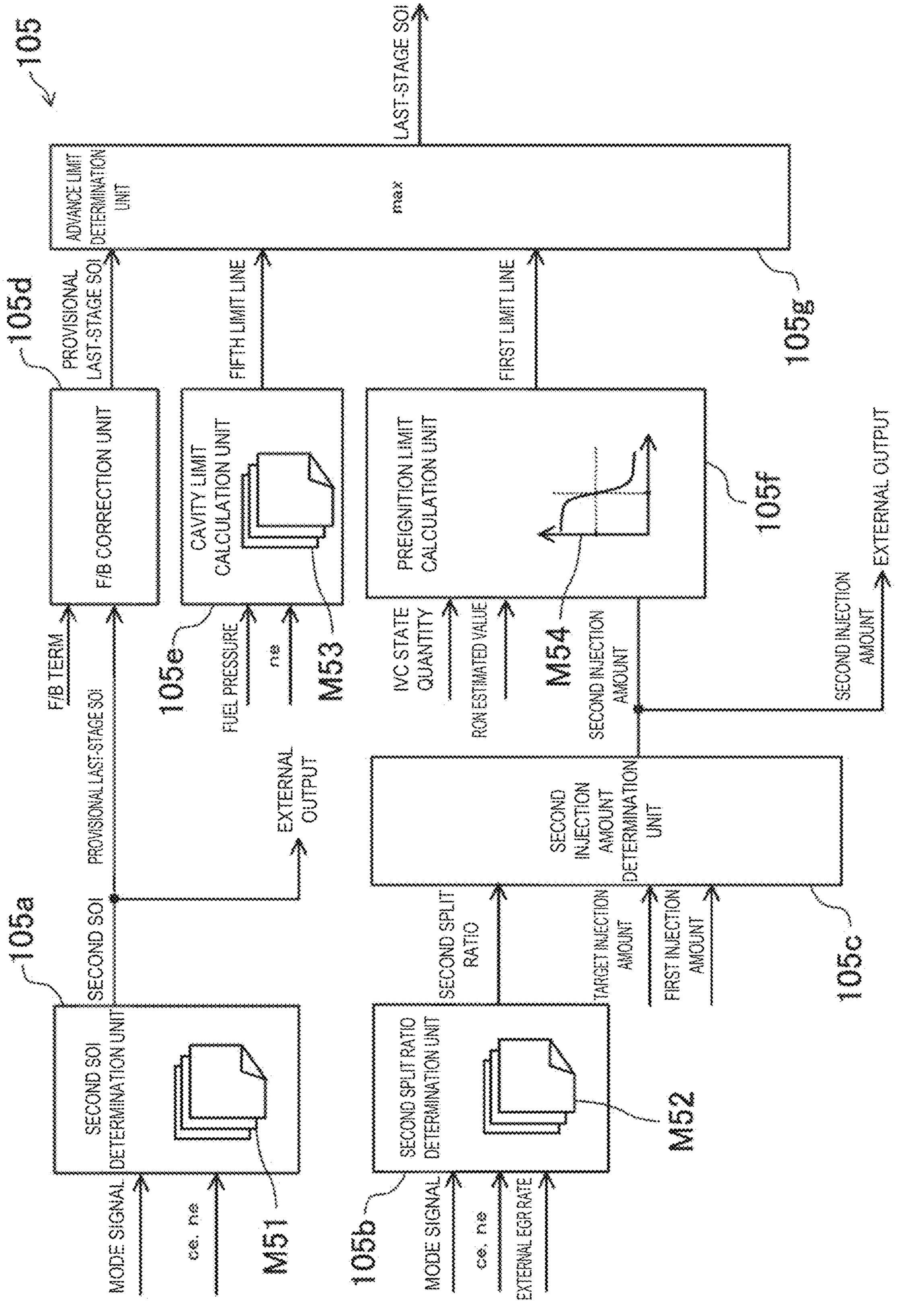

FIG. 8 is a block diagram illustrating the configuration of a second injection calculation unit.

Figure 9:
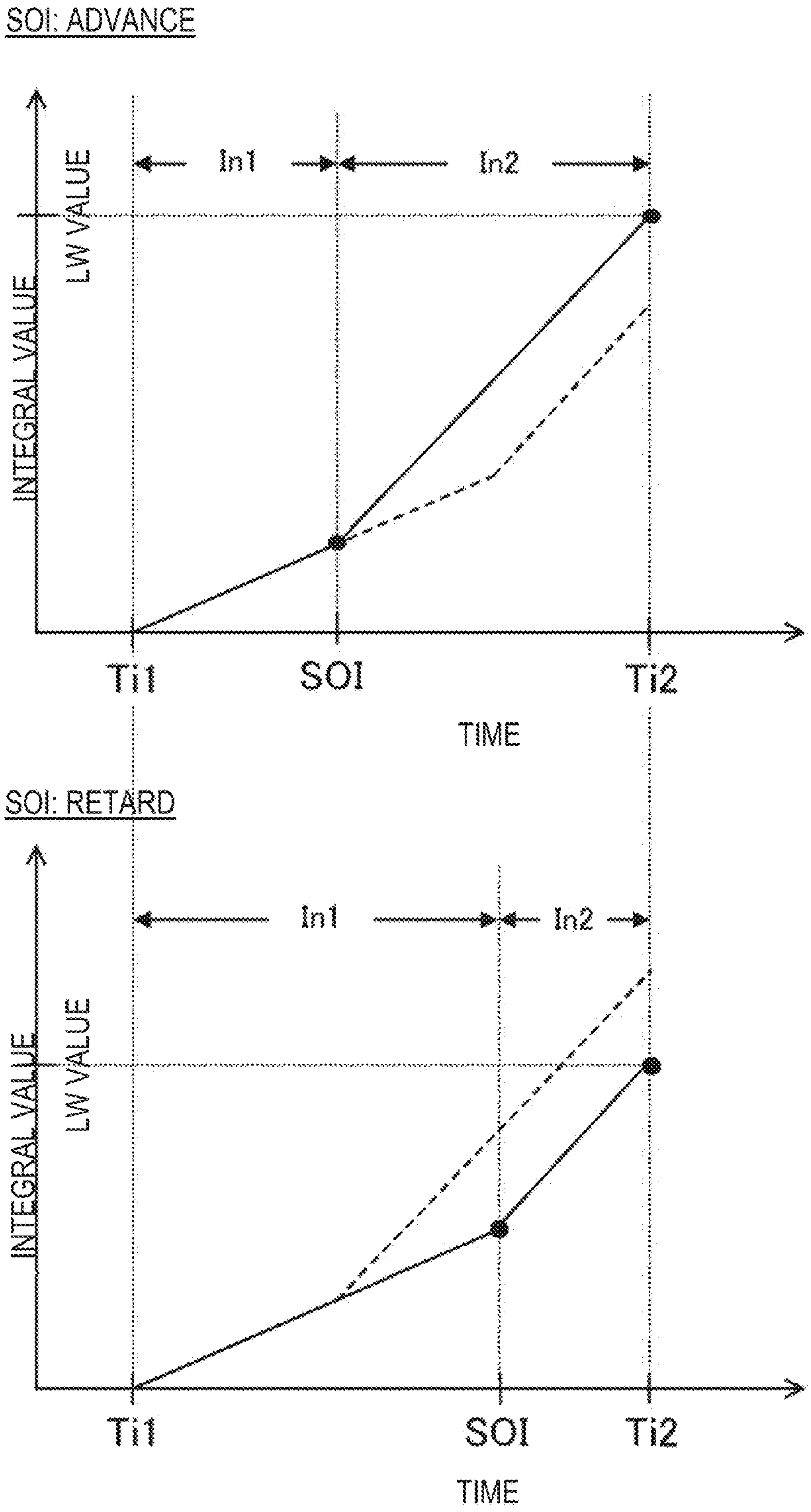

FIG. 9 is a diagram for describing a model of an LW value in a preignition limit calculation unit.

Figure 10:
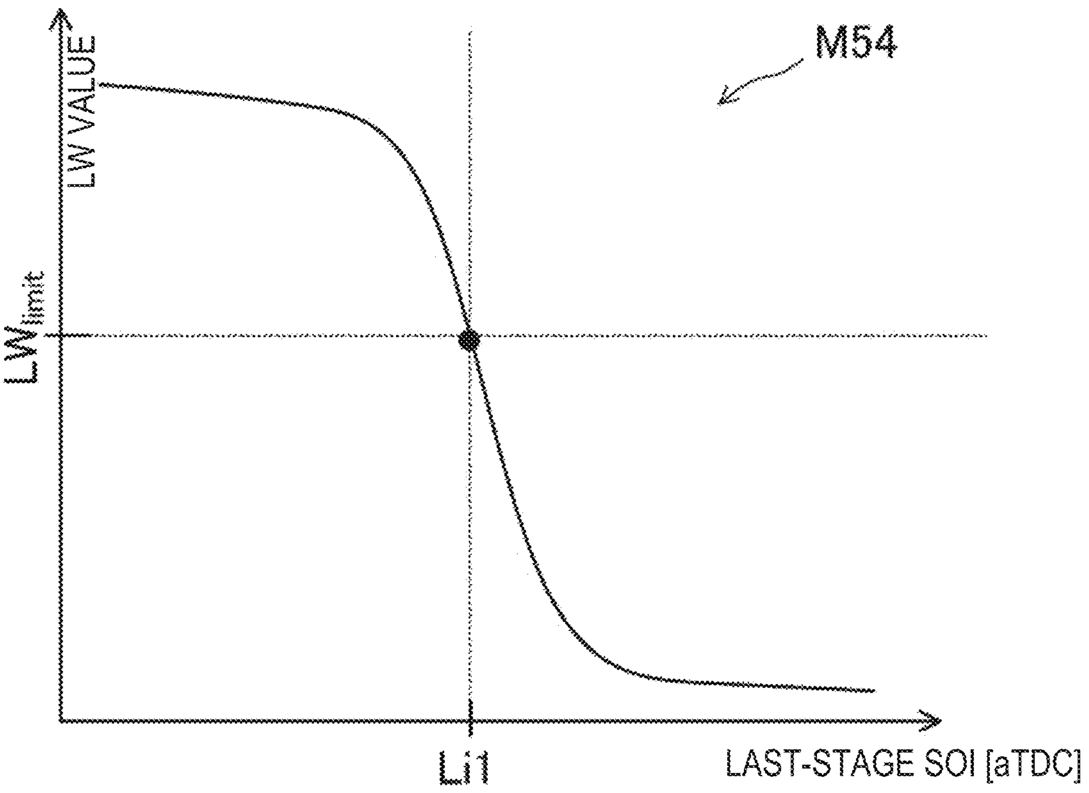

FIG. 10 is a diagram for describing the time integral of an ignition delay related to the LW value.

Figure 11:
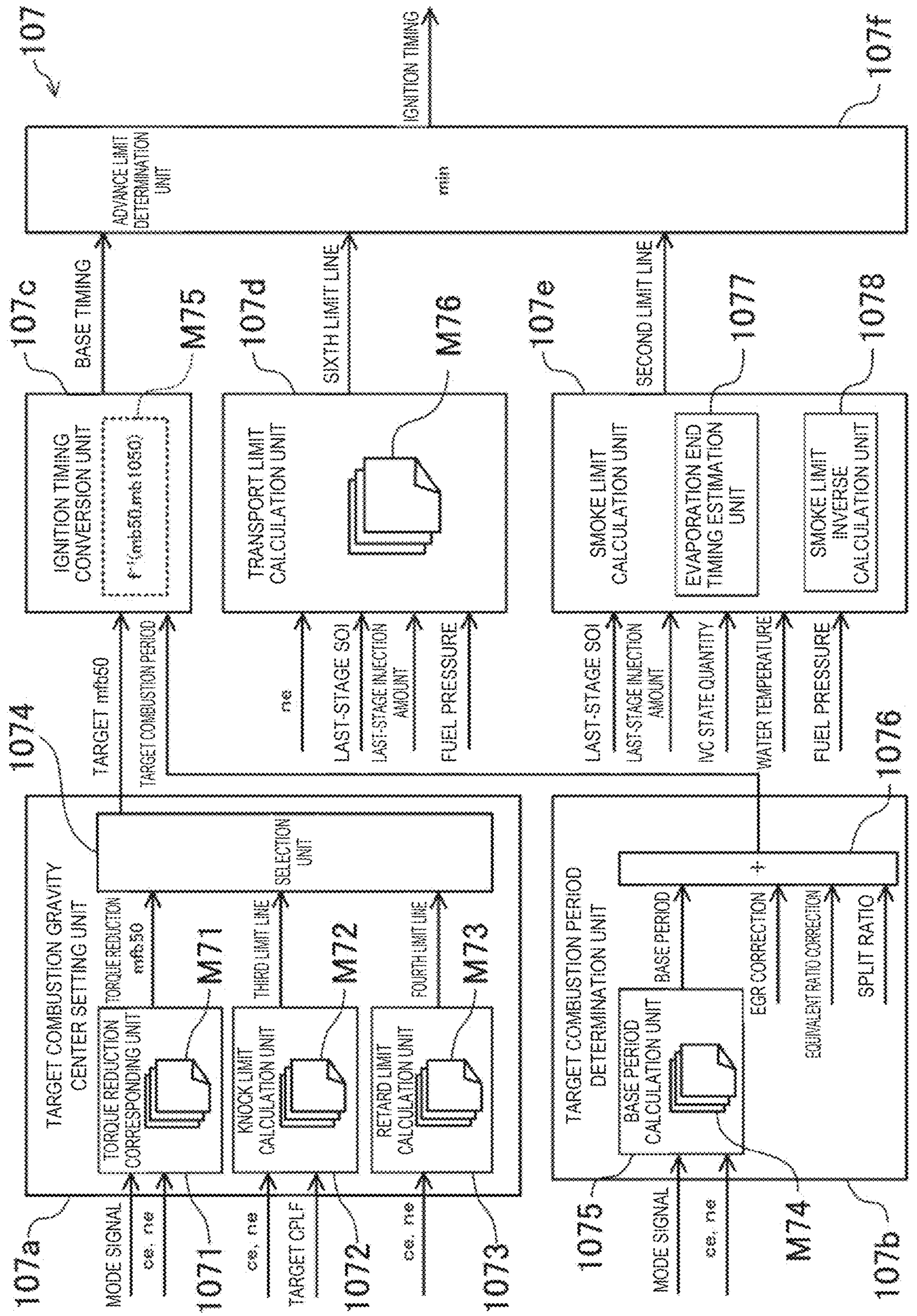

FIG. 11 is a diagram illustrating a model that defines the relationship between a first limit line and an LW limit value.

Figure 12:
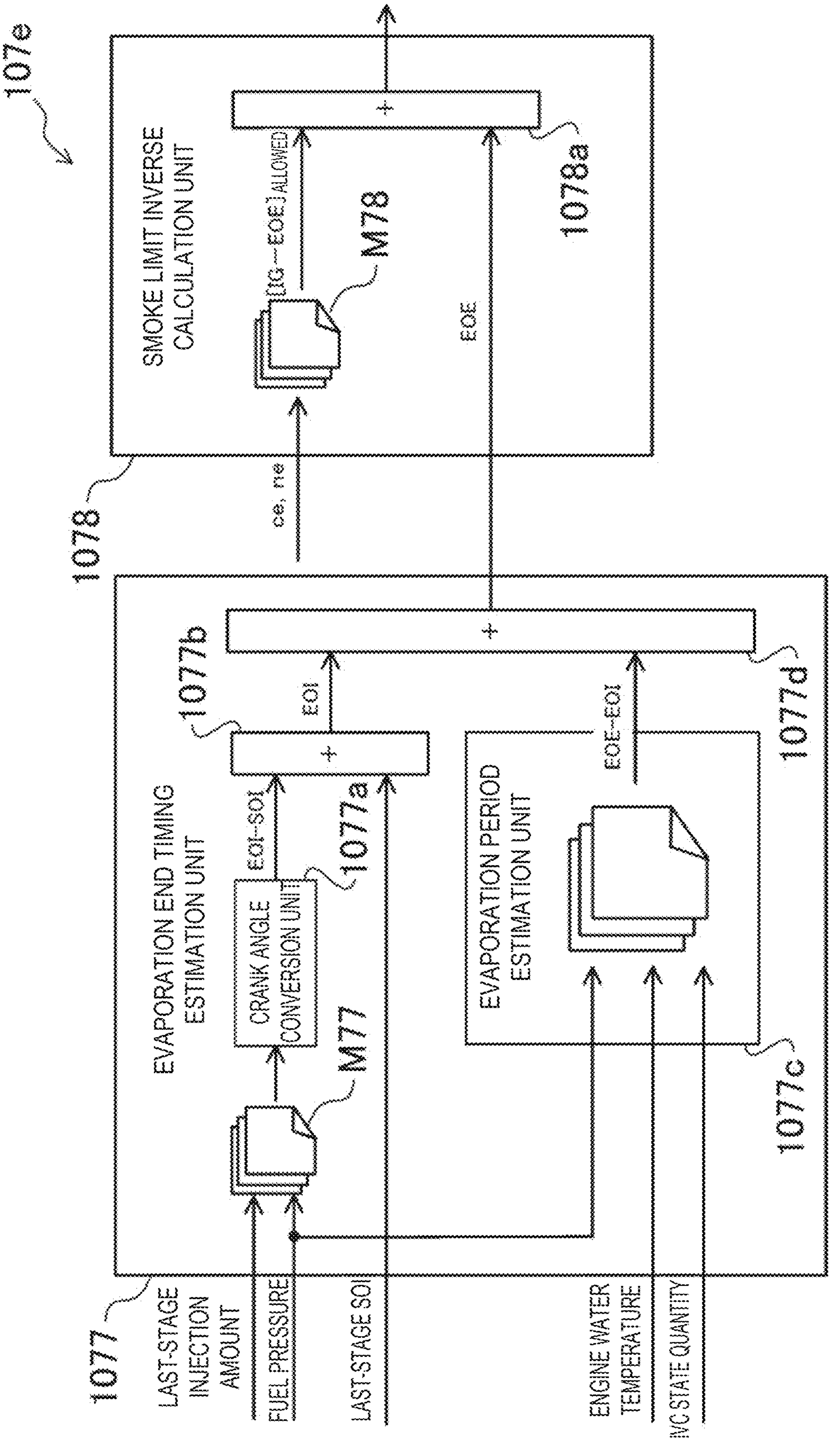

FIG. 12 is a block diagram illustrating the configuration of a smoke limit calculation unit.

Figure 13:
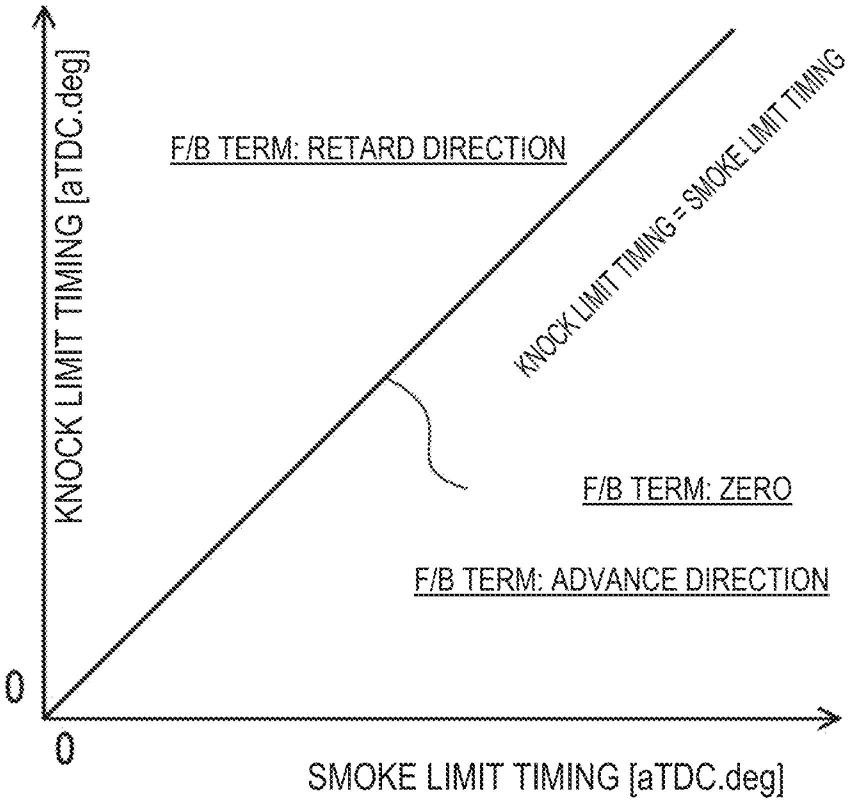

FIG. 13 is a diagram for describing the sign of an F/B term.

Figure 14:
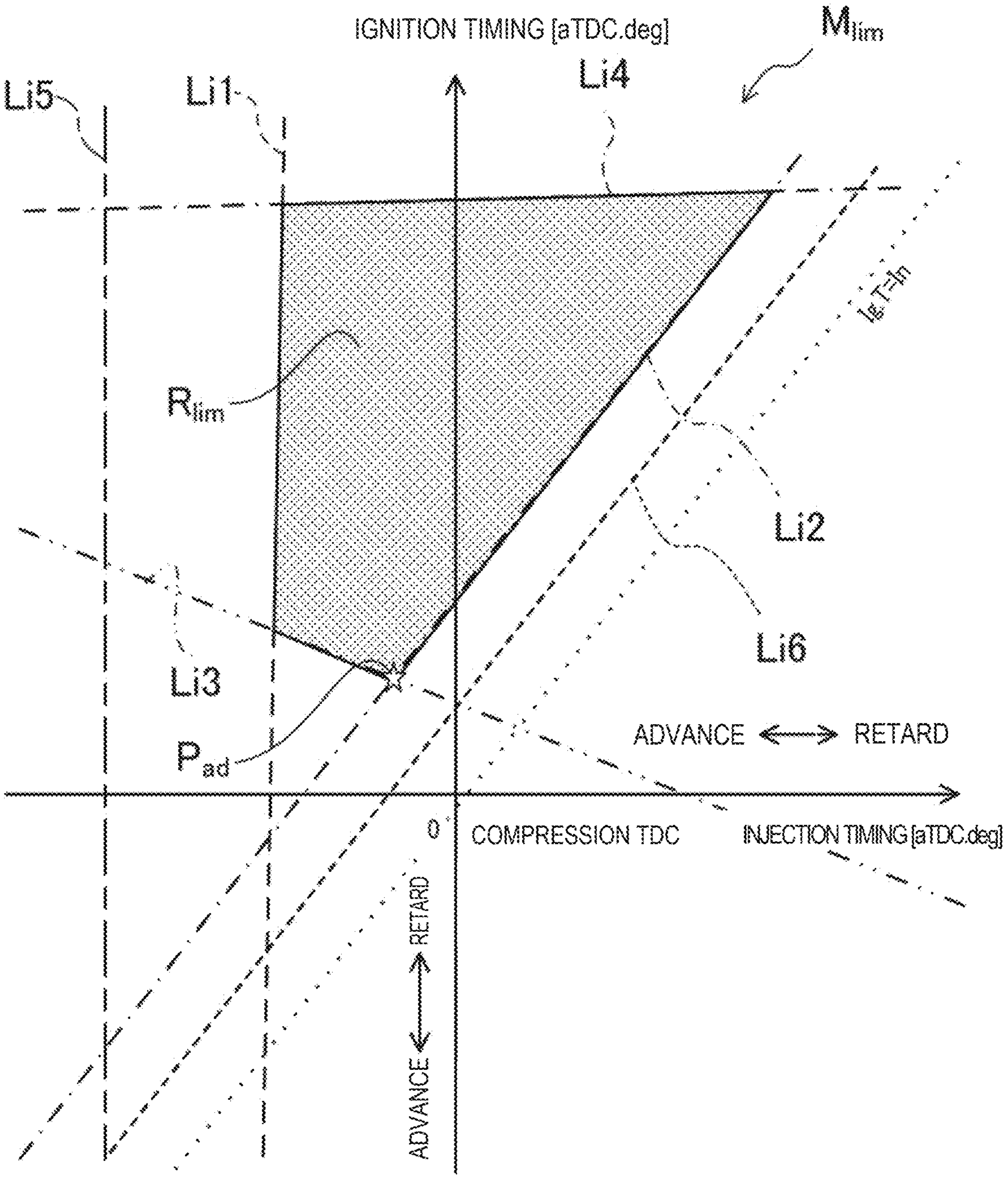

FIG. 14 is a schematic diagram illustrating a parameter region.

Figure 15A:
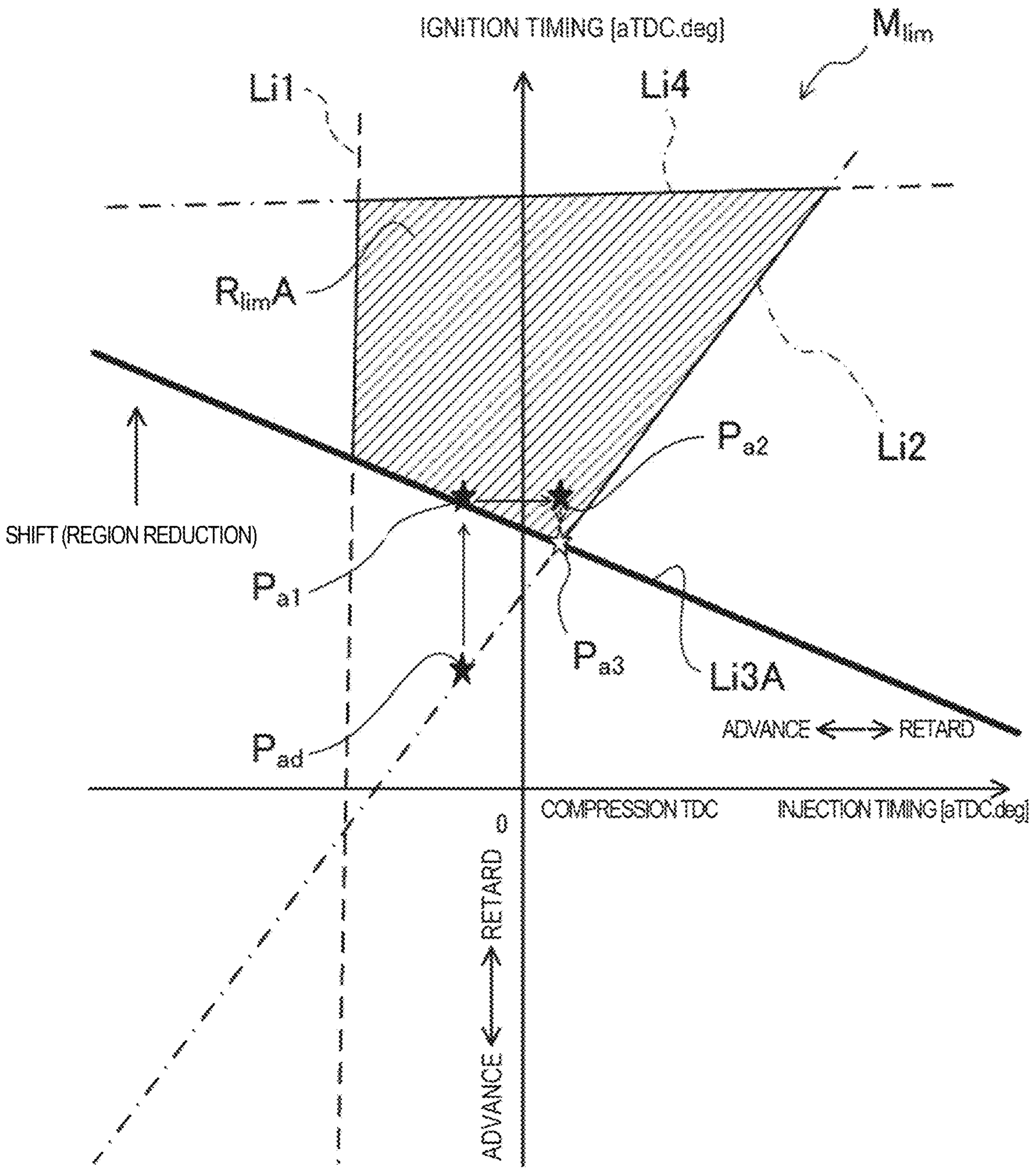

FIG. 15A is a schematic diagram illustrating the movement of a control point when the parameter region is reduced.

Figure 15B:
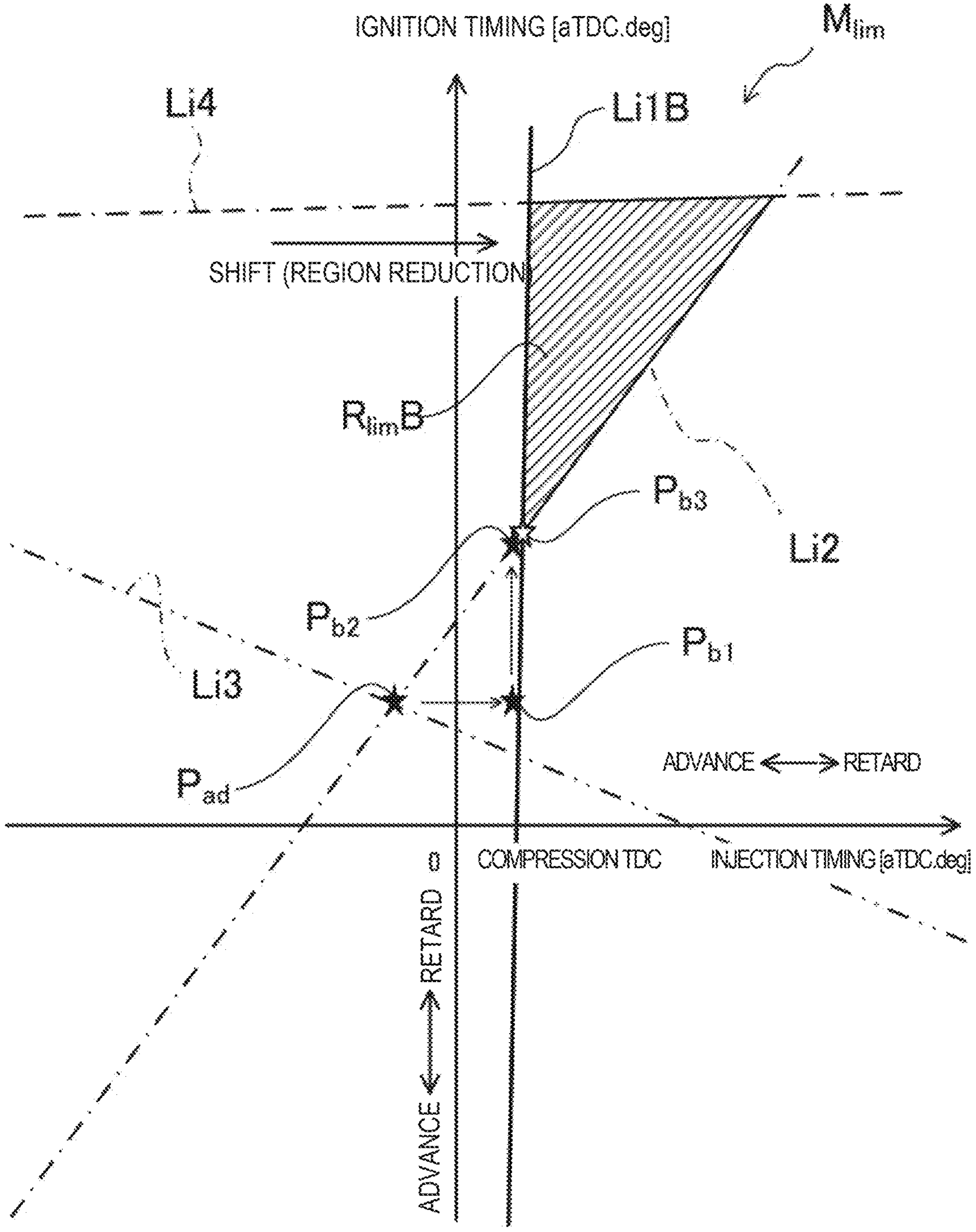

FIG. 15B is a schematic diagram illustrating the movement of the control point when the parameter region is reduced.

Figure 15C:
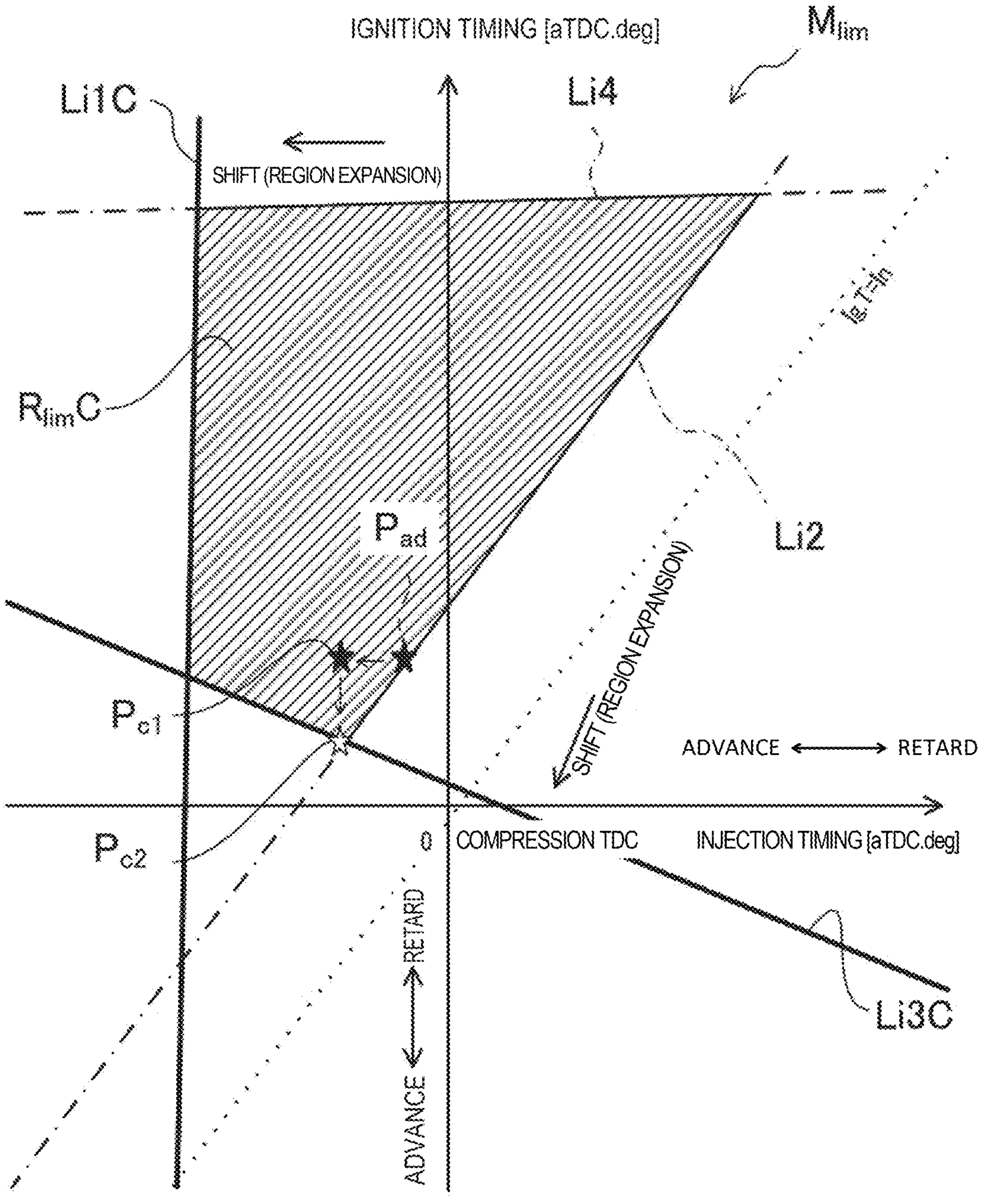

FIG. 15C is a schematic diagram illustrating the movement of the control point when the parameter region is expanded.

Figure 16:
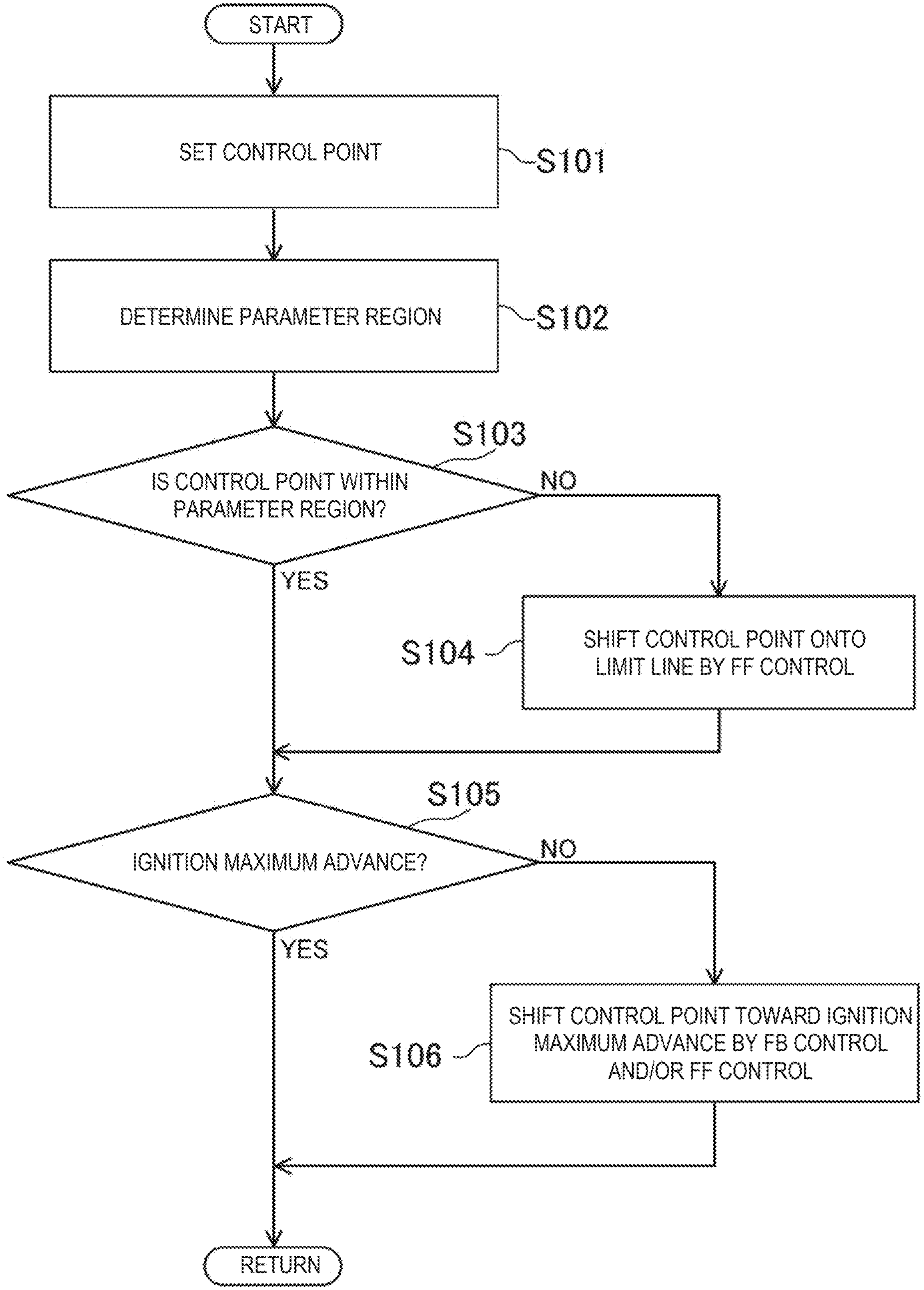

FIG. 16 is a flowchart illustrating a process relating to the movement of the control point.

EXAMPLES FOR CARRYING OUT THE INVENTION

Hereinbelow, a method for controlling an engine will be described with reference to the drawings. The engine and the control method thereof described herein are examples.

Figure 1:
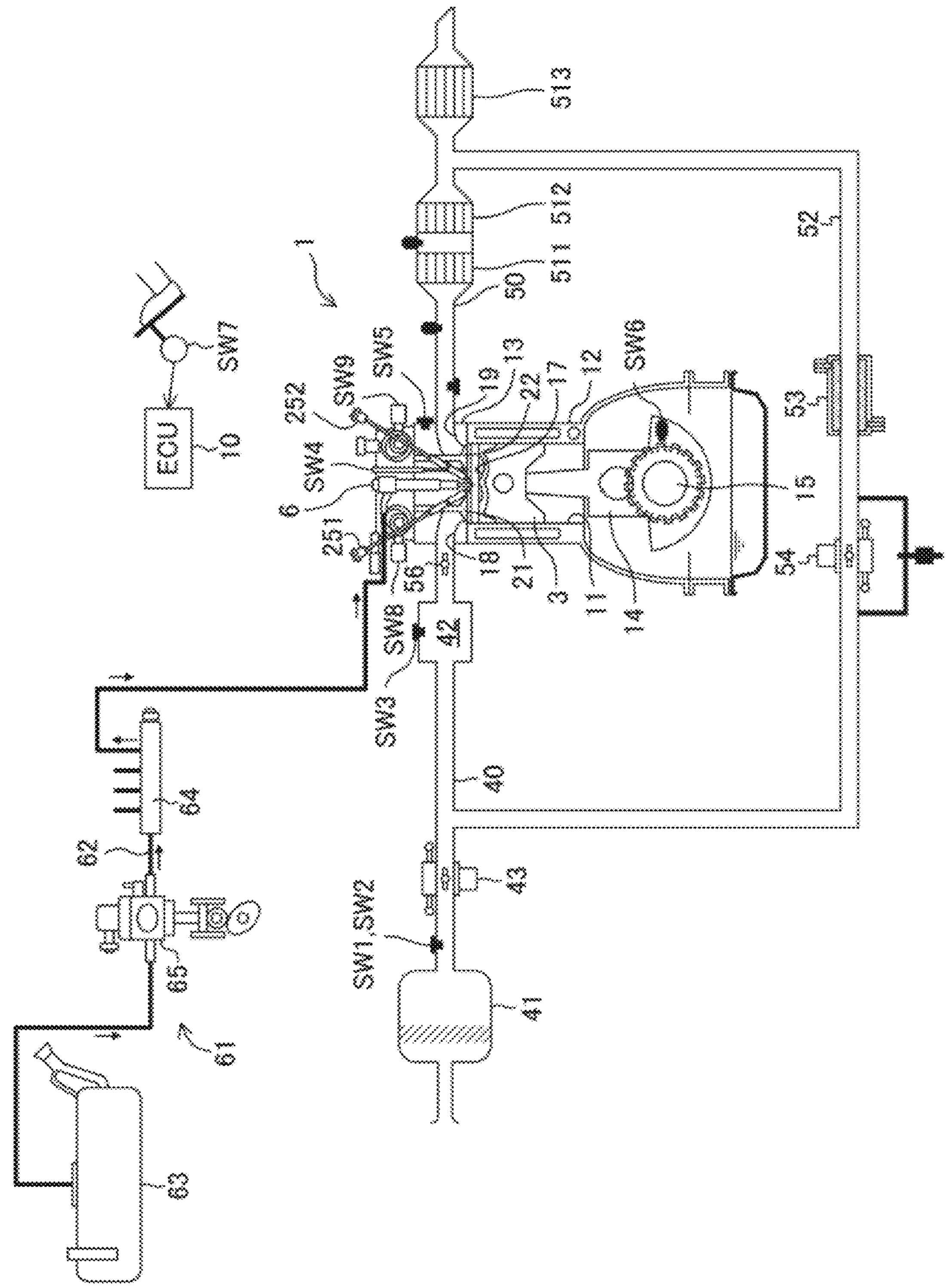
FIG. 1 is a diagram illustrating an engine system.

FIG. 1 is a diagram illustrating an engine system. FIG. 2 is a diagram illustrating the structure of a combustion chamber of an engine. The positions of the intake side and the exhaust side in FIG. 1 and the positions of the intake side and the exhaust side in FIG. 2 are interchanged. FIG. 3 is a block diagram illustrating a control device for an engine.

1. Entire Configuration

The engine system includes an engine 1. The engine 1 includes a cylinder 11. Inside the cylinder 11, an intake stroke, a compression stroke, an expansion stroke, and an exhaust stroke are repeated. The engine 1 is a four-stroke engine. The engine 1 is mounted on a four-wheeled automobile. The automobile travels by the engine 1 operating.

The engine 1 is an engine that is compatible with a plurality of types of fuels. In other words, the engine 1 is a so-called multi-fuel compatible engine. The fuel for the engine 1 may be gasoline, alternative fuels such as naphtha, various carbon-neutral fuels such as methanol, or a mixture of these fuels (a mixture of mixable fuels).

In addition, as gasoline as the fuel for the engine 1, both a high-octane fuel and a low-octane fuel can be used. The octane number of the high-octane fuel is, for example, 100, and the octane number of the low-octane fuel is, for example, 91.

A user of the automobile can fill a fuel tank 63, which will be described further below, with a fuel included in the above-mentioned plurality of types of fuels. For example, after the fuel stored in the fuel tank 63 is used up, a different fuel can be added into the same fuel tank 63. The user can also add a low-octane fuel into the fuel tank 63 in which a high-octane fuel is stored, or add a high-octane fuel into the fuel tank 63 in which a low-octane fuel is stored. When a fuel having a different octane number is added, the octane number of the fuel used by the engine 1 becomes an intermediate octane number.

2. Configuration of Engine

The engine 1 includes a cylinder block 12, and a cylinder head 13. The cylinder head 13 is placed on the cylinder block 12. A plurality of cylinders 11 are formed in the cylinder block 12. The engine 1 is a multi-cylinder engine. FIG. 1 shows only one cylinder 11.

A piston 3 is inserted (housed) in each of the cylinders 11. The piston 3 is coupled to a crankshaft 15 through a connecting rod 14. The piston 3 reciprocates inside the cylinder 11. The piston 3, the cylinder 11, and the cylinder head 13 form a combustion chamber 17.

As shown in the lower drawing of FIG. 2, an inclined surface 1311 and an inclined surface 1312 constitute a lower face of the cylinder head 13, that is, a ceiling portion of the cylinder 11. The inclined surface 1311 is the inclined surface 1311 on the side corresponding to an intake valve 21, which will be described further below, and has an upward slope toward a central portion of the cylinder 11. The inclined surface 1312 is the inclined surface 1312 on the side corresponding to an exhaust valve 22, and has an upward slope toward the central portion of the cylinder 11. The ceiling portion of the cylinder 11 is a so-called pent roof type.

A cavity 31 is formed on an upper face of the piston 3. The cavity 31 is recessed from the upper face of the piston 3. In this configuration example, the cavity 31 has a shallow dish shape. A central portion of the cavity 31 projects upward. The projecting portion has a substantially conical shape.

Note that the shape of the combustion chamber 17 is not limited to the shape illustrated in FIG. 2. For example, the shape of the cavity 31, the shape of the upper face of the piston 3, and the shape of the ceiling surface of the combustion chamber 17 can be changed as appropriate.

The geometric compression ratio of the engine 1 is set to 10 or more and 30 or less. As will be described further below, the engine 1 performs SPCCI combustion, which is a combination of spark ignition (SI) combustion and compression ignition (CI) in some operating ranges. In the SPCCI combustion, the CI combustion is controlled by heat generation and/or pressure increase caused by the SI combustion. The engine 1 is a compression ignition type engine. However, the engine 1 does not require a high temperature in the combustion chamber 17 (that is, a high compression end temperature) when the piston 3 reaches a compression top dead center. Thus, the geometric compression ratio of the engine 1 can be set lower than that of an engine that does not perform SPCCI combustion. A lower geometric compression ratio is advantageous in reducing cooling losses and reducing mechanical losses.

The cylinder head 13 has an intake port 18 formed for each of the cylinders 11. The intake port 18 communicates with the inside of the cylinder 11. Although detailed illustration is omitted, the intake port 18 is a so-called tumble port. That is, the intake port 18 has a shape that generates a tumble flow inside the cylinder 11. The pent roof type ceiling portion of the cylinder 11 and the tumble port generate a tumble flow inside the cylinder 11.

The intake valve 21 is disposed at the intake port 18. The intake valve 21 opens and closes the intake port 18. A valve gear is connected to the intake valve 21. The valve gear opens and closes the intake valve 21 at a predetermined timing. The valve gear is a variable valve gear that varies a valve timing and/or a valve lift. As shown in FIG. 3, the valve gear includes an intake sequential-valve timing (S-VT) 231. The intake S-VT 231 is a hydraulic or electric type. The intake S-VT 231 continuously changes the rotation phase of an intake camshaft within a predetermined angle range.

The valve gear also includes an intake continuously variable valve lift (CVVL) 232. As illustrated in FIG. 5, the intake CVVL 232 can continuously change a lift amount of the intake valve 21 within a predetermined range. The intake CVVL 232 can employ various known configurations. As an example, as described in Japanese Patent Laid-Open No. 2006-85241, the intake CVVL 232 may be configured to include a link mechanism, a control arm, and a stepping motor. The link mechanism causes a cam for driving the intake valve 21 to make a reciprocating swing motion in conjunction with the rotation of the camshaft. The control arm variably sets a lever ratio of the link mechanism. When the lever ratio of the link mechanism changes, a swing amount of the cam that pushes down the intake valve 21 changes. The stepping motor electrically drives the control arm to change the swing amount of the cam, thereby changing the lift amount of the intake valve 21. Note that the intake CVVL 232 is not essential.

The cylinder head 13 has an exhaust port 19 formed for each of the cylinders 11. The exhaust port 19 communicates with the inside of the cylinder 11.

The exhaust valve 22 is disposed at the exhaust port 19. The exhaust valve 22 opens and closes the exhaust port 19. A valve gear is connected to the exhaust valve 22. The valve gear opens and closes the exhaust valve 22 at a predetermined timing. The valve gear is a variable valve gear that varies a valve timing and/or a valve lift. As shown in FIG. 3, the valve gear includes an exhaust S-VT 241. The exhaust S-VT 241 is a hydraulic or electric type. The exhaust S-VT 241 continuously changes the rotation phase of an exhaust camshaft within a predetermined angle range.

The valve gear also includes an exhaust variable valve lift (VVL) 242. Although not illustrated, the exhaust VVL 242 is configured to be capable of switching a cam that opens and closes the exhaust valve 22. The exhaust VVL 242 can employ various known configurations. As an example, as described in Japanese Patent Laid-Open No. 2018-168796, the exhaust VVL 242 includes a first cam, a second cam, and a switching mechanism that performs switching between the first cam and the second cam. The first cam is configured to open and close the exhaust valve 22 in the exhaust stroke. As illustrated in FIG. 5, the second cam is configured to open and close the exhaust valve 22 in the exhaust stroke and open and close the exhaust valve 22 again in the intake stroke. The exhaust VVL 242 can change the lift of the exhaust valve 22 by opening and closing the exhaust valve 22 using either the first cam or the second cam. Note that the exhaust VVL 242 is not essential.

The intake S-VT 231, the intake CVVL 232, the exhaust S-VT 241, and the exhaust VVL 242 adjust the amount of air and the amount of burned gas introduced into the cylinder 11 by controlling the opening and closing of the intake valve 21 and the exhaust valve 22. The intake S-VT 231, the intake CVVL 232, the exhaust S-VT 241, and the exhaust VVL 242 adjust an intake air charging amount.

An injector 6 that injects the fuel into the cylinder 11 is attached to the engine 1. Specifically, the injector 6 is attached to the cylinder head 13 for each of the cylinders 11. As shown in FIG. 2, the injector 6 is disposed at the central portion of cylinder 11. More specifically, the injector 6 is disposed in a valley portion of the pent roof where the inclined surface 1311 and the inclined surface 1312 intersect.

The injector 6 directly injects the fuel into the cylinder 11. Although detailed illustration is omitted, the injector 6 is a multi-nozzle type having a plurality of nozzle holes. As indicated by a dot-dot-dash line in FIG. 2, the injector 6 injects the fuel such that the fuel radially spreads from the central portion of the cylinder 11 toward the periphery. As shown in the lower drawing of FIG. 2, the axis of the nozzle hole of the injector 6 has a predetermined angle θ relative to a central axis X of the cylinder 11. Note that, in the illustrated example, the injector 6 has ten nozzle holes arranged at equal angles in the circumferential direction, but the number and arrangement of nozzle holes are not limited to any particular number and arrangement.

A fuel supply system 61 is connected to the injector 6. The fuel supply system 61 includes the fuel tank 63 that is configured to store the fuel, and a fuel supply passage 62 that couples the fuel tank 63 and the injector 6 to each other. The fuel supply passage 62 is provided with a fuel pump 65, and a common rail 64. The fuel pump 65 pressure-feeds the fuel to the common rail 64. The fuel pump 65 is a plunger type pump that is driven by the crankshaft 15 in this configuration example. The common rail 64 stores the fuel pressure-fed from the fuel pump 65 at a high fuel pressure. When the injector 6 is opened, the fuel stored in the common rail 64 is injected into the cylinder 11 through the nozzle holes of the injector 6. The pressure of the fuel supplied to the injector 6 may be changed in accordance with the operating state of the engine 1. Note that the configuration of the fuel supply system 61 is not limited to the configuration described above.

Spark plugs 251, 252 that ignite an air-fuel mixture containing the fuel injected from the injector 6 are attached to the engine 1. Specifically, the first spark plug 251 and the second spark plug 252 are attached to the cylinder head 13 for each of the cylinders 11. Each of the first spark plug 251 and the second spark plug 252 forcibly ignites the air-fuel mixture inside the cylinder 11. As shown in FIG. 2, the first spark plug 251 is disposed between the two intake valves 21, and the second spark plug 252 is disposed between the two exhaust valves 22. The tip of the first spark plug 251 and the tip of the second spark plug 252 are located near the ceiling portion of the cylinder 11 on the intake side and the exhaust side across the injector 6, respectively. Note that the number of spark plugs may be one.

An intake passage 40 is connected to one side of the engine 1. The intake passage 40 communicates with the intake port 18 of each of the cylinders 11. Air introduced into the cylinders 11 flows through the intake passage 40. An air cleaner 41 is disposed at an upstream end portion of the intake passage 40. The air cleaner 41 filters the air. A surge tank 42 is disposed near a downstream end of the intake passage 40. The intake passage 40 downstream of the surge tank 42 constitutes independent passages that branch off for the cylinders 11. A downstream end of the independent passage is connected to the intake port 18 of the corresponding cylinder 11.

A throttle valve 43 is disposed between the air cleaner 41 and the surge tank 42 in the intake passage 40. The throttle valve 43 can adjust the amount of air introduced into the cylinder 11 by adjusting its opening degree. The throttle valve 43 is basically fully open during the operation of the engine 1. The amount of air introduced is adjusted by the variable valve gear described above.

The engine 1 includes a swirl generator that generates a swirl flow inside the cylinder 11. The swirl generator includes a swirl control valve 56 mounted in the intake passage 40. Although detailed illustration is omitted, of a primary passage and a secondary passage that are connected to each of the cylinders 11, the swirl control valve 56 is disposed in the secondary passage at a position downstream of the surge tank 42. The swirl control valve 56 is an opening degree adjustable valve that can narrow the cross section of the secondary passage. When the opening degree of the swirl control valve 56 is small, the flow rate of intake air flowing into the cylinder 11 through the primary passage is relatively high and the flow rate of intake air flowing into the cylinder 11 through the secondary passage is relatively low, which intensifies the swirl flow inside the cylinder 11. When the opening degree of the swirl control valve 56 is large, the flow rate of intake air flowing into the cylinder 11 through the primary passage and the flow rate of intake air flowing into the cylinder 11 through the secondary passage are substantially equal, which weakens the swirl flow inside the cylinder 11. When the swirl control valve 56 is fully open, no swirl flow is generated. Note that the swirl generator is not essential.

An exhaust passage 50 is connected to the other side of the engine 1. The exhaust passage 50 communicates with the exhaust port 19 of each of the cylinders 11. The exhaust passage 50 is a passage through which exhaust gas exhausted from the cylinders 11 flows. Although detailed illustration is omitted, an upstream portion of the exhaust passage 50 constitutes independent passages that branch off for the cylinders 11. An upstream end of the independent passage is connected to the exhaust port 19 of the corresponding cylinder 11.

An exhaust gas purification system including a plurality of catalytic converters is disposed in the exhaust passage 50. The upstream catalytic converter has, for example, a three-way catalyst 511, and a gasoline particulate filter (GPF) 512. The downstream catalytic converter has a three-way catalyst 513. Note that the exhaust gas purification system is not limited to the illustrated configuration. For example, the GPF may be omitted. In addition, the catalytic converter is not limited to one having a three-way catalyst. Furthermore, the arrangement order of the three-way catalyst and the GPF may be changed as appropriate.

An EGR passage 52 is connected between the intake passage 40 and the exhaust passage 50. The EGR passage 52 is a passage for returning part of the exhaust gas to the intake passage 40. An upstream end of the EGR passage 52 is connected between the upstream catalytic converter and the downstream catalytic converter in the exhaust passage 50. A downstream end of the EGR passage 52 is connected between the throttle valve 43 and the surge tank 42 in the intake passage 40.

A water-cooled EGR cooler 53 is disposed in the EGR passage 52. The EGR cooler 53 cools exhaust gas. In addition, an EGR valve 54 is disposed in the EGR passage 52. The EGR valve 54 adjusts the flow rate of exhaust gas flowing through the EGR passage 52. By adjusting the opening degree of the EGR valve 54, the amount of returning the cooled exhaust gas can be adjusted.

3. Basic Configuration of Control Device

As shown in FIG. 3, a control device for the engine 1 includes an engine control unit (ECU) 10 for operating the engine 1. The ECU 10 includes circuitry such as a programmable microcomputer-based controller, and includes a central processing unit (CPU) 100*a*, a memory 100*b*, and an interface (I/F) circuit 100*c*. The CPU 100*a* executes programs. The memory 100*b* is composed of, for example, a random access memory (RAM) or a read only memory (ROM), and stores programs and data. The I/F circuit 100*c* inputs and outputs electric signals. The ECU 10 is an example of the controller. While the ECU 10 described above includes circuitry that is programmable, it may also include fixed circuitry such as an application specific IC (ASIC) and/or one or more programmable array logic circuitry (PAL). The ECU 10 as the controller constitutes the engine system together with the engine 1.

The ECU 10 is electrically connected to, for example, the injector 6, the first spark plug 251 and the second spark plug 252. The ECU 10 controls each of the injector 6, the first spark plug 251, and the second spark plug 252.

As shown in FIGS. 1 and 3, various sensors SW1 to SW14 are connected to the ECU 10. The sensors SW1 to SW14 output signals to the ECU 10. The sensors include the following sensors. The sensors SW11 to SW14 are shown only in FIG. 3.

Airflow Sensor SW1: The airflow sensor SW1 is disposed downstream of the air cleaner 41 in the intake passage 40 and measures the flow rate of air flowing through the intake passage 40.

Intake Air Temperature Sensor SW2: The intake air temperature sensor SW2 is disposed downstream of the air cleaner 41 in the intake passage 40, and measures the temperature of air flowing through the intake passage 40.

Intake Air Pressure Sensor SW3: The intake air pressure sensor SW3 is attached to the surge tank 42, and measures the pressure of air introduced into the cylinder 11.

In-cylinder Pressure Sensor SW4: The in-cylinder pressure sensor SW4 is attached to the cylinder head 13 corresponding to each of the cylinders 11, and measures the pressure inside the cylinder 11.

Water Temperature Sensor SW5: The water temperature sensor SW5 is attached to the engine 1, and measures the temperature of cooling water.

Crank Angle Sensor SW6: The crank angle sensor SW6 is attached to the engine 1, and measures the rotation angle of the crankshaft 15.

Accelerator OpeningDegree Sensor SW7: The accelerator opening degree sensor SW7 is attached to an accelerator pedal mechanism, and measures an accelerator opening degree corresponding to the amount of operation of an accelerator pedal.

Intake Cam Angle Sensor SW8: The intake cam angle sensor SW8 is attached to the engine 1, and measures the rotation angle of the intake camshaft.

Exhaust Cam Angle Sensor SW9: The exhaust cam angle sensor SW9 is attached to the engine 1, and measures the rotation angle of the exhaust camshaft.

Intake Cam Lift Sensor SW10: The intake cam lift sensor SW10 is attached to the engine 1, and measures the lift amount of the intake valve 21.

Fuel Pressure Sensor SW11: The fuel pressure sensor SW11 is attached to the common rail 64 of the fuel supply system 61, and detects the pressure of the fuel supplied to the injector 6.

EGR Differential Pressure Sensor SW12: The EGR differential pressure sensor SW12 detects the differential pressure between upstream and downstream of the EGR valve 54.

Linear $O_2$ Sensor SW13: The linear $O_2$ sensor SW13 is disposed upstream of the upstream catalytic converter in the exhaust passage 50, and detects the oxygen concentration in exhaust gas.

Lambda $O_2$ Sensor SW14: The lambda $O_2$ sensor SW14 is disposed downstream of the three-way catalyst 511 in the upstream catalytic converter, and detects the oxygen concentration in exhaust gas.

The ECU 10 determines the operating state of the engine 1 based on signals from these sensors SW1 to SW14 and calculates a control amount of each device in accordance with a predetermined control logic. The control logic is stored in the memory 100*b*. The control logic includes calculating a target amount and/or the control amount using a map stored in the memory 100*b*.

The ECU 10 outputs electric signals related to the calculated control amount to the injector 6, the first spark plug 251, the second spark plug 252, the intake S-VT 231, the intake CVVL 232, the exhaust S-VT 241, the exhaust VVL 242, the fuel supply system 61, the throttle valve 43, the EGR valve 54, and the swirl control valve 56.

4. Engine Operation Control Map

FIG. 4 illustrates a base map related to control of the engine 1. The base map is stored in the memory 100*b* of the ECU 10. The base map includes at least a first base map 401 shown in FIG. 4. The ECU 10 may use another base map different from the first base map 401 in accordance with the level of the cooling water temperature of the engine 1. The first base map 401 is the base map used to control the engine 1 when the engine 1 is warm.

The ECU 10 may use another base map different from the first base map 401 in accordance with the octane number of the fuel. The first base map 401 is, for example, the base map used when the octan number=91.

The first base map 401 is defined by the load and the speed of the engine 1. The first base map 401 is broadly divided into four regions: a first region, a second region, a third region, and a fourth region, in accordance with the level of the load and the level of the engine speed.

More specifically, the first region includes a high speed region 411, and a low load region 412. The high speed region 411 extends over the entire low to high load regions. The low load region 412 extends over the low and medium speed regions.

The second region corresponds to a first medium load region 413. The first medium load region 413 is adjacent to the high load side of the low load region 412, and extends from the low load to the medium load and also extends over the low and medium speed regions.

The third region includes a second medium load region 414, and a high load and medium speed region 415. The second medium load region 414 is adjacent to the high load side of the first medium load region 413, and extends from the medium load to the high load and also extends over the low and medium speed regions. The high load and medium speed region 415 is adjacent to the high load side of the second medium load region 414, and extends over the medium speed region.

The fourth region corresponds to a high load and low speed region 416. The high load and low speed region 416 is adjacent to the high load side of the second medium load region 414, and extends over the low speed region. The fourth region is the region including the maximum load of the engine 1.

Here, the low speed region, the medium speed region, and the high speed region may be a low speed region, a medium speed region, and a high speed region obtained by dividing the entire operating region of the engine 1 into three equal regions in the engine speed direction.

In addition, the low load region, the medium load region, and the high load region may be a low load region, a medium load region, and a high load region obtained by dividing the entire operating region of the engine 1 into three equal regions in the load direction.

5. Combustion Mode of Engine

Next, the operation of the engine 1 in each region will be described in detail. The ECU 10 selects a combustion mode of the air-fuel mixture inside the cylinder 11 by checking a target load of the engine 1 and the speed of the engine 1 against the first base map 401 illustrated in FIG. 4.

Then, the ECU 10 sets the opening and closing operation of the intake valve 21 and the exhaust valve 22, the number of fuel injections, a fuel split ratio in each injection, a fuel injection timing, and an ignition timing of the first and second spark plugs 251, 252 so as to achieve the selected combustion mode.

The combustion mode achieved in the engine 1 includes homogeneous SI combustion, SPCCI combustion, and retard SI combustion. The combustion modes differ from each other in at least one of the opening and closing operation of the intake valve 21 and the exhaust valve 22, the number of fuel injections, the fuel split ratio in each injection, the fuel injection timing, and the ignition timing of the first and second spark plugs 251, 252.

Note that the "split ratio" here refers to the ratio of the injection amount at a specific injection timing to the total fuel injection amount in one fuel cycle.

FIG. 5 illustrates the opening and closing operation of the intake valve 21 and the exhaust valve 22, the number of fuel injections, the fuel split ratio, the fuel injection timing, and the ignition timing, and a waveform of a heat generation rate generated inside the cylinder 11 by the combustion of the air-fuel mixture, corresponding to each combustion mode. The crank angle progresses from left to right in FIG. 5. Hereinbelow, each combustion mode will be described with an example in which the engine 1 is warm.

(5-1. Homogeneous SI Combustion)

When the operating state of the engine 1 is in the first region, that is, in the high speed region 411 or the low load region 412, the ECU 10 causes the air-fuel mixture inside the cylinder 11 to burn by flame propagation. More specifically, the intake S-VT 231 sets the opening and closing timing of the intake valve 21 to a predetermined timing. The intake CVVL 232 sets the lift amount of the intake valve 21 to a predetermined lift amount. The lift amount of the intake valve 21 is substantially equal to the lift amount of the exhaust valve 22, which will be described further below. The exhaust S-VT 241 sets the opening and closing timing of the exhaust valve 22 to a predetermined timing. The intake valve 21 and the exhaust valve 22 are both opened near an intake top dead center (refer to reference numeral 711). The exhaust VVL 242 opens and closes the exhaust valve 22 only once. This opening and closing mode of the intake valve 21 and the exhaust valve 22 introduces a relatively large amount of air and a relatively small amount of burned gas into the cylinder 11. The burned gas is basically an internal EGR gas that remains inside the cylinder 11.

The injector 6 injects the fuel into the cylinder 11, for example, within a period of the intake stroke (refer to reference numeral 712). The injector 6 may perform batch injection as shown in the illustrated example. The fuel injected into the cylinder 11 is diffused by a strong intake air flow. An air-fuel mixture with homogeneous fuel concentration is formed inside the cylinder 11. The mass ratio of the air-fuel mixture, that is, the mass ratio G/F of the intake air inside the cylinder 11 containing the burned gas to the fuel is, for example, approximately 20. Note that the mass ratio A/F of the air inside the cylinder 11 to the fuel is the theoretical air-fuel ratio.

Both the first spark plug 251 and the second spark plug 252 ignite the air-fuel mixture near the compression top dead center (refer to reference numeral 713). The first spark plug 251 and the second spark plug 252 may perform the ignition at the same time or at different timings.

After the ignition of the first spark plug 251 and the second spark plug 252, the air-fuel mixture burns by flame propagation (refer to reference numeral 714). In the high speed region 411 in which the engine speed is too high and compression ignition combustion is thus difficult and in the low load region 412 in which the load is too low and compression ignition combustion is thus difficult, the engine 1 can operate while ensuring combustion stability and restraining abnormal combustion.

Since this combustion mode burns the homogeneous air-fuel mixture by spark ignition, this combustion mode may be referred to as the homogeneous SI combustion.

(5-2. SPCCI Combustion)

When the operating state of the engine 1 is in the second region (the first medium load region 413) or the third region (the second medium load region 414 or the high load and medium speed region 415), the ECU 10 causes part of the air-fuel mixture inside the cylinder 11 to burn by flame propagation and causes the rest of the air-fuel mixture to burn by compression ignition. More specifically, the exhaust S-VT 241 sets the opening and closing timing of the exhaust valve 22 to a predetermined timing. The exhaust VVL 242 opens and closes the exhaust valve 22 once or twice (refer to reference numerals 721, 731). The internal EGR gas is introduced into the cylinder 11. The intake CVVL 232 sets the lift amount of the intake valve 21 to be larger than the lift amount in the low load region 412. The closing timing of the intake valve 21 is approximately the same as the closing timing in the low load region 412. The opening timing of the intake valve 21 is advanced relative to the opening timing in the low load region 412. This opening and closing mode of the intake valve 21 and the exhaust valve 22 increases the amount of air introduced into the cylinder 11 and reduces the amount of burned gas introduced into the cylinder 11. The G/F of the air-fuel mixture is, for example, 35.

The injector 6 injects the fuel into the cylinder 11, for example, within a period of the intake stroke (refer to reference numerals 722, 7321). The injector 6 may inject the fuel different number of times in accordance with the target load of the engine 1 (or a required value of the charging efficiency).

As an example, when the operating state of the engine 1 is in the second region (the first medium load region 413), the ECU 10 according to the present embodiment performs batch injection of the fuel within the period of the intake stroke (refer to reference numeral 722). On the other hand, for example, when the operating state of the engine 1 is in the third region (the second medium load region 414 or the high load and medium speed region 415), the ECU 10 performs former-stage injection 7321 within the period of the intake stroke and latter-stage injection 7322 in the second half or the late stage of the compression stroke. A late fuel injection timing in the third region in which the load is high is advantageous in restraining abnormal combustion.

Note that the second half of the compression stroke corresponds to the second half when the compression stroke is divided into two equal parts: the first half and the second half. The late stage of the compression stroke corresponds to the late stage when the compression stroke is divided into three equal parts: the early stage, the middle stage, and the late stage.

Similarly, the first half of the compression stroke corresponds to the first half when the compression stroke is divided into two equal parts: the first half and the second half. The early stage of the compression stroke corresponds to the early stage when the compression stroke is divided into three equal parts: the early stage, the middle stage, and the late stage. The middle stage of the compression stroke corresponds to the middle stage when the compression stroke is divided into three equal parts: the early stage, the middle stage, and the late stage.

Both the first spark plug 251 and the second spark plug 252 ignite the air-fuel mixture near the compression top dead center (refer to reference numerals 723, 733). The air-fuel mixture starts flame propagation combustion near the compression top dead center after the ignition of the first spark plug 251 and the second spark plugs 252. Heat generated by the flame propagation combustion raises the temperature inside the cylinder 11, and the flame propagation increases the pressure inside the cylinder 11. This causes the unburned air-fuel mixture to self-ignite, for example, after the compression top dead center and start compression ignition combustion (refer to reference numerals 724, 734). After the start of the compression ignition combustion, the flame propagation combustion and the compression ignition combustion proceed in parallel. The waveform of the heat generation rate may have two peaks unlike the illustrated example.

Variations in the temperature inside the cylinder 11 before the start of compression can be absorbed by adjusting the amount of heat generated by the flame propagation combustion. The amount of heat generated by the flame propagation combustion can be adjusted by the ECU 10 adjusting the ignition timing. The air-fuel mixture self-ignites at a target timing. In the SPCCI combustion, the ECU10 adjusts the timing of compression ignition through the adjustment of the ignition timing. This combustion mode may be referred to as spark controlled compression ignition (SPCCI) combustion because the ignition controls compression ignition.

(5-3. Retard SI Combustion)

When the operating state of the engine 1 is in the fourth region, that is, in the high load and low speed region 416, the ECU 10 causes the air-fuel mixture inside the cylinder 11 to burn by flame propagation. More specifically, when the operating state of the engine 1 is in the high load and low speed region 416, the intake S-VT 231 sets the opening and closing timing of the intake valve 21 to a predetermined timing. The intake CVVL 232 sets the lift amount of the intake valve 21 to a predetermined lift amount. The lift amount of the intake valve 21 is substantially equal to the lift amount of the exhaust valve 22, which will be described further below. The exhaust S-VT 241 sets the opening and closing timing of the exhaust valve 22 to a predetermined timing. The intake valve 21 and the exhaust valve 22 are both opened near the intake top dead center (refer to reference numeral 741). The exhaust VVL 242 opens and closes the exhaust valve 22, for example, once. This opening and closing mode of the intake valve 21 and the exhaust valve 22 introduces a relatively large amount of air and a relatively small amount of burned gas into the cylinder 11. The burned gas is basically an internal EGR gas that remains inside the cylinder 11. The G/F is approximately 20.

Since the high load and low speed region 416 is the region in which the load is high and the engine speed is low, abnormal combustion such as preignition or knocking is likely to occur. The injector 6 injects the fuel into the cylinder 11 within a period of the compression stroke (refer to reference numerals 7421, 7422). By delaying the timing of injecting the fuel into the cylinder 11, the occurrence of abnormal combustion is restrained. The injector 6 may perform batch injection instead of the number of injections in the illustrated example.

The fuel injected into the cylinder 11 during the period of the compression stroke is diffused by the flow of the injection. A higher fuel injection pressure is preferable in combusting the air-fuel mixture rapidly to restrain the occurrence of abnormal combustion and improve combustion stability. High injection pressure generates a strong flow inside the cylinder 11 in which the pressure is high near the compression top dead center. The strong flow accelerates flame propagation.

Both the first spark plug 251 and the second spark plug 252 ignite the air-fuel mixture near the compression top dead center (refer to reference numeral 743). The first spark plug 251 and the second spark plug 252 may perform the ignition at the same time or at different timings. In the high load and low speed region 416 in which the load is high, the first spark plug 251 and the second spark plug 252 may perform the ignition at a timing after the compression top dead center corresponding to the retarded fuel injection timing. Alternatively, the first spark plug 251 and the second spark plug 252 may perform the ignition at a timing before the compression top dead center, for example, during the fuel injection from the injector 6. After the ignition of the first spark plug 251 and the second spark plug 252, the air-fuel mixture burns by flame propagation (refer to reference numeral 744).

In an operating state in which the engine speed is low and abnormal combustion is likely to occur, the engine 1 can operate while ensuring combustion stability and restraining abnormal combustion. Since the injection timing is retarded in this combustion mode, this combustion mode may be referred to as retard SI combustion. As with the SPCCI combustion described above, the air-fuel mixture ignited in the fourth region may burn by compression ignition after the flame propagation combustion.

As an example, when the operating state of the engine 1 is in the fourth region (the high load and low speed region 416), the ECU 10 according to the present embodiment performs the former-stage injection 7421 in the second half or the middle stage of the compression stroke, and, after the former-stage injection, performs the latter-stage injection 7422 in the second half or the late stage of the compression stroke.

In the second half of the compression stroke, for example, the injector 6 and the cavity 31 are closer to each other and, at the same time, the cavity 31 and the spark plugs 251, 252 are closer to each other than in the first half of the compression stroke. This, combined with the high injection pressure as described above, makes it possible to quickly transport the spray injected toward the cavity 31 to the spark plugs 251, 252. This can shorten the time from the fuel injection to the start of combustion of the air-fuel mixture. Accordingly, it is possible to complete the combustion of the air-fuel mixture before knocking occurs.

In addition, high injection pressure generates a strong flow as described above. The strong flow can increase the turbulent combustion speed. This makes it possible to achieve rapid combustion of the air-fuel mixture.

In addition, injecting the fuel in the second half of the compression stroke, combined with the high injection pressure, makes a period for air and the fuel to mix (mixing period) shorter than that in other combustion patterns such as the homogeneous SI combustion and the SPCCI combustion. By forming the air-fuel mixture within a short period of time, homogenization of the air-fuel mixture can be promptly advanced up to an equivalent ratio (a local equivalent ratio inside the cylinder 11) that restrains the occurrence of smoke.

As described above, the ECU 10 can use different injection patterns of the fuel into the cylinder 11 for different combustion modes such as the SPCCI combustion and the retard SI combustion. Alternatively, different injection modes can be used within the same combustion mode for, for example, SPCCI combustion at high ce and SPCCI combustion at low ce that are classified as the same combustion mode.

The "injection mode" here refers to the number of fuel injections in each stroke in one combustion cycle, such as "once in the intake stroke+zero in the compression stroke", "once in the intake stroke+once in the compression stroke", and "zero in the intake stroke+twice in the compression stroke".

The ECU 10 according to the present embodiment is configured to use a plurality of types of combustion modes through this switching of the injection modes. That is, determining the injection mode is substantially equivalent to determining the combustion mode of the fuel. In the present embodiment, the first base map 401 shown in FIG. 4 is defined as the map that specifies the injection mode corresponding to each region instead of the combustion mode.

However, determining the injection mode alone does not uniquely determine a control parameter of the engine 1. For example, after determining the injection mode, it is favorable to determine the control parameter of the engine 1 in the determined injection mode. The control parameter here is a concept that includes at least a combination of the fuel injection timing and the ignition timing.

The ECU 10 determines the control parameter of the engine 1 for each combustion cycle. The ECU 10 performs such determination at at least one of a first timing T1 and a second timing T2 in FIG. 5.

The first timing T1 is a calculation timing that is set in the exhaust stroke, more specifically, within the range from the middle stage to the late stage of the exhaust stroke. For example, the first timing T1 may be −480° or more and −360° or less after the TDC, and, more specifically, −440° or more and −400° or less after the TDC. Note that the TDC here refers to the "compression TDC" as shown in FIG. 5. In the following description, the "compression TDC" may also be simply referred to as the "TDC".

The first timing T1 is the calculation timing of determining the injection mode and executing a process related to fuel injection during the intake stroke (hereinbelow, also referred to as the "first injection"), such as the former-stage injection 7321 of high load SPCCI combustion. The first injection can also be referred to as the "intake stroke injection".

The second timing T2 is a calculation timing that is set in the compression stroke, more specifically, within the range from the early stage to the middle stage of the compression stroke. For example, the second timing T2 may be −240° or more and −60° or less after the TDC, and, more specifically, −150° or more and −90° or less after the TDC.

The second timing T2 is the calculation timing of executing a process related to fuel injection during the compression stroke (hereinbelow, also referred to as the "second injection"), such as the former-stage injection 7421 and the latter-stage injection 7422 of the retard SI combustion, and the latter-stage injection 7322 of the high load SPCCI combustion. The second injection can also be referred to as the "compression stroke injection".

The ECU 10 first determines the injection mode at the first timing T1. In the case of the homogeneous SI combustion and the SPCCI combustion at low load (low ce), the ECU10 determines all the control parameters at the first timing T1. In the case of the SPCCI combustion at high load (high ce) and the retard SI combustion, the ECU 10 determines some of the control parameters at the first timing T1 and then determines the remaining control parameters at the second timing T2. A third timing (not shown) may be set at the late stage of the compression stroke, and partial control may be performed at the third timing T3.

In this manner, the ECU 10 constitutes the control device for the engine 1 that determines the injection mode and determines the control parameters corresponding to the determined injection mode. Hereinbelow, the configuration of the ECU 10 as the control device and the procedures for determining the injection timing and the ignition timing as the control parameters will be described.

6. Details of Control Device

FIG. 6 is a block diagram illustrating details of the control device for the engine 1. As shown in FIG. 6, the control device includes an operating state determination unit 101, an injection mode determination unit 102, a first injection calculation unit 103, a first injection conversion unit 104, a second injection calculation unit 105, a second injection conversion unit 106, an ignition timing calculation unit 107, and an F/B term calculation unit 108. These elements are functional blocks of the ECU 10. The control device sequentially sets the control parameters during the operation of the engine 1.

(6-1. Operating State Determination Unit)

The operating state determination unit 101 calculates the speed (ne) and the target load of the engine 1 based on measurement signals of the sensors SW1 to SW10. As is well known, the speed of the engine 1 (hereinbelow, simply referred to as the "speed") can be calculated based on a detection signal of the crank angle sensor SW6.

In addition, the operating state determination unit 101 calculates a target charging efficiency (ce) of the engine 1 as a state quantity that characterizes the target load of the engine 1. Not only the target charging efficiency, but also the amount of air supplied into the cylinder 11 may be used.

Hereinbelow, the target charging efficiency may be referred to as the "target air amount" or simply referred to as the "target load".

For example, the operating state determination unit 101 calculates a target engine torque based on a detection signal of the accelerator opening degree sensor SW7, and then calculates a target combustion pressure corresponding to the target engine torque. Next, the operating state determination unit 101 calculates the target charging efficiency based on the target combustion pressure. The operating state determination unit 101 sets various control targets that characterize the in-cylinder state of the engine 1 such as a target throttle opening degree and a target external EGR rate so that the target charging efficiency is achieved.

In addition, based on the set target charging efficiency, the operating state determination unit 101 also sets a target value of the total fuel injection amount in one combustion cycle so that the air-fuel ratio of the air-fuel mixture becomes a target air-fuel ratio such as the theoretical air-fuel ratio.

In addition, the operating state determination unit 101 estimates the state quantity inside the cylinder 11 at the time when the intake valve 21 is closed (that is, at the time of IVC). Hereinbelow, this state quantity is also referred to as the "IVC state quantity". To estimate the IVC state quantity, in addition to the detection signal of the crank angle sensor SW6 described above, the operating state determination unit 101 obtains measurement signals of the intake cam angle sensor SW8, the exhaust cam angle sensor SW9, and the intake cam lift sensor SW10, and, when fuel injection is performed during the intake stroke, also obtains signals related to the amount of fuel injection.

The operating state determination unit 101 estimates the IVC state quantity based on these measurement signals. Specifically, the operating state determination unit 101 estimates, for example, an in-cylinder temperature $T_{IVC}$, an in-cylinder oxygen concentration $[O2]_{IVC}$, and an in-cylinder fuel concentration $[F]_{IVC}$ at the time of the IVC. The operating state determination unit 101 also obtains an in-cylinder pressure $P_{IVC}$ at the time of the IVC as one of the IVC state quantities.

Note that various calculations based on the target engine torque, the target combustion pressure, and the like can employ, for example, methods described in Japanese Patent Laid-Open No. 2018-84181, Japanese Patent Laid-Open No. 2018-84182, Japanese Patent Laid-Open No. 2020-101163, and details thereof are thus omitted.

Similarly, the estimation of the IVC state quantity is described in, for example, Japanese Patent Laid-Open No. 2023-53507 and the like, and details thereof are thus omitted.

In addition, the operating state determination unit 101 can also estimate the octane number of the fuel filled in the fuel tank 63. The procedure for calculating this estimated value (hereinbelow, also referred to as the "RON estimated value") can employ, for example, methods described in Japanese Patent Laid-Open No. 2021-92198 and Japanese Patent Laid-Open No. 2021-92200, and details thereof are thus omitted.

The operating state determination unit 101 executes these calculations at the first timing T1 described above, and inputs various calculation results including the engine speed and the target load to the injection mode determination unit 102, the first injection calculation unit 103, the second injection calculation unit 105, and the ignition timing calculation unit 107.

(6-2. Injection Mode Determination Unit)

The injection mode determination unit 102 determines the injection mode to be performed at the operation of the engine 1 based on at least the engine speed and the target load (target air amount).

First, the injection mode determination unit 102 reads a base map corresponding to the RON estimated value and determines the combustion mode (specifically, the injection mode) corresponding to the operating state of the engine 1 by checking the engine speed and the target load against the base map (e.g., the first base map 401).

The injection mode determination unit 102 executes these calculations continuously from the calculations of the operating state determination unit 101 starting at the first timing T1, and inputs a signal indicating the determined injection mode (mode signal) to the first injection calculation unit 103 and the second injection calculation unit 105.

(6-3. First Injection Calculation Unit)

FIG. 7 is a block diagram illustrating the configuration of the first injection calculation unit 103. The first injection calculation unit 103 is a functional block that determines target values of the control parameters that characterize the intake stroke injection. The control parameters determined by the first injection calculation unit 103 include the injection timing during the intake stroke and the fuel injection amount during the intake stroke.

To determine these control parameters, the first injection calculation unit 103 shown in FIG. 7 includes a first SOI determination unit 103*a*, a first split ratio determination unit 103*b*, and a first injection amount determination unit 103*c*.

[6-3-1. First SOI Determination Unit]

The first SOI determination unit 103*a* determines a start of injection timing (SOI) of the intake stroke injection based on the mode signal, the engine speed, and the target load described above. This determination can be performed, for example, by checking values of the engine speed and the target load against an intake SOI map M31 corresponding to the injection mode.

Here, the intake SOI map M31 is a map that associates the values of the engine speed and the target load with the SOI of the intake stroke injection. A plurality of intake SOI maps M31 are, for example, prepared for different injection modes, and each of the intake SOI maps M31 is previously stored in the memory 100*b*.

[6-3-2. First Split Ratio Determination Unit]

The first split ratio determination unit 103*b* determines the split ratio of the intake stroke injection based on the mode signal, the engine speed and the target load, and the target external EGR rate. This determination can be performed, for example, by checking values of the engine speed, the target load, and the external EGR rate against an intake split ratio map M32 corresponding to the injection mode.

Here, the intake split ratio map M32 is a map that associates the values of the engine speed and the target load with the split ratio of the intake stroke injection. A plurality of intake split ratio maps M32 are, for example, prepared for different injection modes and set so that the split ratio continuously changes in accordance with the external EGR rate, and each of the intake split ratio maps M32 is previously stored in the memory 100*b*. If no compression stroke injection is performed, the split ratio is 1.

[6-3-3. First Injection Amount Determination Unit]

The first injection amount determination unit 103*c* determines the fuel injection amount in the intake stroke injection by multiplying the split ratio determined by the first split ratio determination unit 103*b* by the target injection amount set by the operating state determination unit 101. The target injection amount here is the target value of the total fuel injection amount in one fuel cycle as described above.

[6-3-4. Calculation Timing]

The first injection calculation unit 103 executes these calculations continuously from the calculations of the operating state determination unit 101 and the injection mode determination unit 102 starting at the first timing T1. The first injection calculation unit 103 inputs a signal indicating the SOI of the intake stroke injection and a signal indicating the fuel injection amount in the intake stroke injection to the first injection conversion unit 104, the second injection calculation unit 105, and the like.

Hereinbelow, the SOI of the intake stroke injection may be referred to as the "first SOI", the split ratio of the intake stroke injection may be referred to as the "first split ratio", and the fuel injection amount in the intake stroke injection may be referred to as the "first injection amount".

In addition, when no intake stroke injection is performed as in the retard SI combustion, the calculation of the first SOI is skipped, and the first split ratio is zero.

(6-4. First Injection Conversion Unit)

The first injection conversion unit 104 generates a drive current for the injectors 6 based on the first SOI and the first injection amount determined by the first injection calculation unit 103. The ECU 10 inputs the drive current generated by the first injection conversion unit 104 to the injectors 6.

(6-5. Second Injection Calculation Unit)

FIG. 8 is a block diagram illustrating the configuration of the second injection calculation unit 105. The second injection calculation unit 105 is a functional block that determines target values of control parameters that characterize the compression stroke injection. The control parameters determined by the second injection calculation unit 105 include the injection timing during the compression stroke, and the fuel injection amount during the compression stroke.

To determine these control parameters, the second injection calculation unit 105 shown in FIG. 5 includes a second SOI determination unit 105*a*, a second split ratio determination unit 105*b*, a second injection amount determination unit 105*c*, an F/B correction unit 105*d*, a cavity limit calculation unit 105*e*, a preignition limit calculation unit 105*f*, and an advance limit determination unit 105*g*.

[6-5-1. Second SOI Determination Unit]

The second SOI determination unit 105*a* determines a start of injection timing (SOI) of the compression stroke injection based on the mode signal, the engine speed, and the target load described above. Hereinbelow, the SOI corresponding to each compression stroke injection is referred to as the "second SOI". The determination of the second SOI can be performed, for example, by checking values of the engine speed and the target load against a compression SOI map M51 corresponding to the injection mode.

Here, the compression SOI map M51 is a map that associates the values of the engine speed and the target load with the SOI of the compression stroke injection. A plurality of compression SOI maps M51 are, for example, prepared for different injection modes, and each of the compression SOI maps M51 is previously stored in the memory 100*b*.

In addition, when the compression stroke injection is performed a plurality of times, the second SOI determination unit 105*a* determines the SOI for each of the compression stroke injections. In this case, the SOI for each compression stroke injection can be determined by using the compression SOI map M51 set for each fuel injection.

The second SOI determination unit 105*a* inputs the second SOI in the last-stage compression stroke injection close to the compression TDC among one or more second SOIs to the F/B correction unit 105*d*, and also inputs all the second SOIs including the last-stage compression stroke injection to the second injection conversion unit 106. Hereinbelow, the last-stage second SOI is also referred to as the "last-stage SOI". In addition, an output value of the second SOI determination unit 105*a* corresponds to a provisional value of the last-stage SOI. Hereinbelow, this provisional value is also referred to as the "provisional last-stage SOI".

[6-5-2. Second Split Ratio Determination Unit]

When the compression stroke injection is performed a plurality of times, the second split ratio determination unit 105*b* determines the split ratio for each of the compression stroke injections. Hereinbelow, the split ratio corresponding to each compression stroke injection is referred to as the "second split ratio". The second split ratio may be the ratio of the fuel injection amount in each compression stroke injection to the fuel injection amount in the entire compression stroke.

For example, when the compression stroke injection is performed only once, the second split ratio is 1. On the other hand, in the case of an injection mode in which the compression stroke injection is performed twice such as the retard SI combustion, the second split ratio is the ratio of the fuel injection amount in the latter-stage injection 7422 to the sum of the fuel injection amount in the former-stage injection 7421 and the fuel injection amount in the latter-stage injection 7422.

Specifically, the second split ratio determination unit 105*b* determines the second split ratio based on the mode signal, the engine speed and the target load, and the target external EGR rate. This determination can be performed, for example, by checking values of the engine speed, the target load, and the external EGR rate against a compression split ratio map M52 corresponding to the injection mode. At the time of the determination, calculation may be performed by a combination with the value of the first split ratio.

Here, the compression split ratio map M52 is a map that associates the values of the engine speed and the target load with the second split ratio. A plurality of compression split ratio maps M52 are, for example, prepared in accordance with the presence or absence of the external EGR rate, and each of the compression split ratio maps M52 is previously stored in the memory 100*b*

[6-5-3. Second Injection Amount Determination Unit]

The second injection amount determination unit 105*c* determines the fuel injection amount in each compression stroke injection based on the split ratio determined by the second split ratio determination unit 105*b* and the first injection amount determined by the first injection amount determination unit 103*c*. Hereinbelow, the fuel injection amount corresponding to each compression stroke injection is referred to as the "second injection amount".

Specifically, the second injection amount determination unit 105*c* first calculates the total fuel injection amount in the compression stroke injection by subtracting the first injection amount from the target injection amount. By multiplying the calculated value by each second split ratio, the second injection amount determination unit 105*c* determines each second injection amount.

The second injection amount determination unit 105*c* inputs all second injection amounts to the preignition limit calculation unit 105*f*, distinguishing the second injection amount in the last-stage compression stroke injection close to the compression TDC from the other injection amounts among one or more second injection amounts. The second injection amount determination unit 105*c* also inputs all the second injection amounts to the second injection conversion unit 106. Hereinbelow, the second injection amount of the last stage is also referred to as the "last-stage injection amount".

[6-5-4. F/B Correction Unit]

The F/B correction unit 105*d* adds an F/B term to the provisional last-stage SOI determined by the second SOI determination unit 105*a*. The F/B term is added to the provisional last-stage SOI, thereby retarding or advancing the provisional last-stage SOI. Details of the F/B term will be described further below.

The provisional last-stage SOI to which the F/B term is added by the F/B correction unit 105*d* is input to the advance limit determination unit 105*g*. Hereinbelow, an output value of the F/B correction unit 105*d* is also referred to as the "provisional last-stage SOI".

[6-5-5. Transport Limit Calculation Unit]

The cavity limit calculation unit 105*e* calculates a fifth limit line Li5 based on the operating state of the engine 1. The fifth limit line Li5 defines a lower limit value (advance limit) of the last-stage SOI together with a first limit line Li1, which will be described further below. The fifth limit line Li5 indicates the limit value for allowing the fuel injected from the injector 6 to reach the inside of the cavity 31.

That is, when the last-stage SOI is excessively advanced, the fuel is injected with the piston 3 excessively lowered relative to the injector 6. In this case, the spray injected from the injector 6 may be positioned outside the cavity 31, and the air-fuel mixture may not sufficiently reach the vicinity of the first and second spark plugs 251, 252. This may result in unstable ignition by the first and second spark plugs 251, 252. The unstable ignition may cause deterioration in the fuel efficiency and is thus unfavorable.

On the other hand, the cavity limit calculation unit 105*e* according to the present embodiment determines the fifth limit line Li5 as the advance limit of the last-stage SOI based on the fuel pressure and the engine speed.

For example, the cavity limit calculation unit 105*e* shifts the fifth limit line Li5 to the advanced side relative to the compression TDC as the fuel pressure increases. This is because when the fuel pressure is high, it is easier for the fuel to reach the first and second spark plugs 251, 252 than when the fuel pressure is low, and setting the advance limit of the last-stage SOI to a more advanced side is thus allowed.

Similarly, the cavity limit calculation unit 105*e* shifts the fifth limit line Li5 to the advanced side relative to the compression TDC as the engine speed increases. Typically, when the engine speed is high, the time required to change the crank angle by 1° is shorter than that when the engine speed is low. Thus, at spraying from the injector 6, the piston 3 can be brought close to the injector 6 within a short time. Thus, when the engine speed is high, it is easier for the fuel to reach the first and second spark plugs 251, 252 than when the engine speed is low, and setting the advance limit of the last-stage SOI to a more advanced side is thus allowed.

In this manner, the cavity limit calculation unit 105*e* determines the fifth limit line Li5 based on the fuel pressure and the engine speed. This determination can be performed, for example, by checking measured values of the fuel pressure and the engine speed against a fifth limit map M53 that defines the fifth limit line Li5.

Here, the fifth limit map M53 is a map that associates the values of the fuel pressure, the engine speed, and the target load with a value of the fifth limit line Li5. The specific value of the fifth limit line Li5 is tuned in accordance with the geometric shape of the cavity 31 and the layout of the injector 6, the first spark plug 251, and second spark plug 252. The fifth limit map M53 is previously stored in the memory 100*b*.

The fifth limit line Li5 determined by the cavity limit calculation unit 105*e* is input to the advance limit determination unit 105*g*.

[6-5-6. Preignition Limit Calculation Unit]

The preignition limit calculation unit 105*f* calculates the first limit line Li1 based on the operating state of the engine 1. The first limit line Li1 defines the lower limit value (advance limit) of the last-stage SOI together with the fifth limit line Li5 described above. The first limit line Li1 indicates the limit value at which preignition is restrained.

That is, excessively advancing the last-stage SOI may cause preignition before ignition as a result of too early fuel injection from the injector 6. The occurrence of preignition is unfavorable in improving the fuel efficiency of the engine 1, and also unfavorable because the preignition can damage the engine 1.

On the other hand, as shown in FIG. 8, the preignition limit calculation unit 105*f* according to the present embodiment determines the first limit line Li1 as the advance limit of the last-stage SOI based on the RON estimated value, the IVC state quantity, and the second injection amount. The IVC state quantity referred to here includes, for example, the in-cylinder temperature $T_{IVC}$, the in-cylinder oxygen concentration $[O2]_{IVC}$, the in-cylinder fuel concentration $[F]_{IVC}$, and the in-cylinder pressure $P_{IVC}$ at the time of the IVC.

Based on a value of the Livengood-Wu integral (LW value) that defines a reaction rate at which a substance reaches self-ignition, the preignition limit calculation unit 105*f* according to the present embodiment searches for the lower limit value (advance limit) of the last-stage SOI that keeps the LW value equal to or less than a reference value. In the search, the preignition limit calculation unit 105*f* uses a model M54 that defines the relationship between the first limit line Li1 and a LW limit value $LW_{limit}$ (details are shown in FIG. 10, which will be described further below). The preignition limit calculation unit 105*f* sets the lower limit value as the first limit line Li1 indicating the advance limit of the last-stage SOI.

Note that the definition of the Livengood-Wu integral is described in, for example, Japanese Patent Laid-Open No. 2019-39384, Japanese Patent Laid-Open No. 2022-12228, and the like and details thereof are thus omitted.

As is well known, the Livengood-Wu integral is the time integral of the reaction rate defined by the inverse of an ignition delay t. The ignition delay t varies with the concentration (e.g., the molar fraction) of each substance, the pressure, and the temperature inside the cylinder.

Here, for example, when the fuel injection is performed twice during the compression stroke as in the retard SI combustion, the substance concentration, the pressure, and the temperature inside the cylinder significantly change between the first injection timing (the first second SOI) and the second injection timing (the second second SOI corresponding to the last-stage SOI).

Thus, the inventors of the present application have divided the integration interval of the reaction rate into an interval from the first injection timing to the last-stage SOI, which is the second injection timing, and an interval from the second injection timing to a predetermined timing after the compression TDC. Hereinbelow, the first half interval is referred to as the first interval In1, the latter interval is referred to as the second interval In2, and the predetermined timing is also referred to as the "LW value determination timing".

When the ignition delay in the first interval In1 is denoted as τ1, the ignition delay in the second interval In2 is denoted as τ2, the first injection timing is denoted as Ti1, the LW value determination timing is denoted as Ti2, and the last-stage SOI is simply denoted as "SOI" to simplify the description, the time integral indicating the LW value can be modeled as in the following formula (1) and FIG. 9.

[Formula 1]

$$LW = \frac{1}{\tau 1} \times (soi - Ti1) + \frac{1}{\tau 2} \times (Ti2 - soi) \tag{1}$$

In formula (1), Ti1 is the crank angle that is set within a range from the middle stage of the compression stroke to the late stage of the compression stroke and is, for example, a predetermined value that is set within a range of −70 [° C. A] or more and −50 [° C. A] or less after the compression TDC. On the other hand, Ti2 is the crank angle that is set within a range of the early stage of the expansion stroke in the case of the retard SI combustion and is, for example, a predetermined value that is set within a range of 20 [° C. A] or more and 60 [° C. A] or less after the compression TDC.

In the present embodiment, the last-stage SOI (SOI) is searched for within a range in which the LW value defined by formula (1) does not exceed a predetermined value around 1 (e.g., 0.9). Hereinbelow, this predetermined value is referred to as the LW limit value $LW_{limit}$.

In addition, both τ1 and τ2 can be modeled as in the following formula (2).

[Formula 2]

$$\tau = a * 10^{-b} * P^{-c} * (YF_{CO_2} + YF_{H_2O})^{-d} * YF_{O_2}^{-e} * YF_{Fuel}^{-f} * \exp\left(\frac{F(RON) \times \beta}{T}\right) \tag{2}$$

In formula (2), a, b, c, d, e, and f are numerical parameters obtained as a result of intensive studies conducted by the inventors of the present application. All of these parameters are positive in the present embodiment.

In addition, $YF_X$ is the molar fraction of a substance X, and F (RON) is a function that takes the RON estimated value as an argument. This F is a function that is a positive value and has a positive correlation to the RON estimated value. In addition, β is a constant that can be different values between the first interval In1 and the second interval In2 and is a parameter that is previously stored in the memory 100*b*.

The preignition limit calculation unit 105*f* reads the RON estimated value and also reads the different values β for the first interval In1 and the second interval In2, and substitutes the read values into formula (2).

In addition, based on the IVC state quantity, the second injection amount, and the like, the preignition limit calculation unit 105*f* calculates the in-cylinder pressure P and the in-cylinder temperature T at Ti1 and the in-cylinder pressure P and the in-cylinder temperature T at a predetermined timing near the last-stage SOI, and substitutes each of the calculated values into formula (2).

Here, the "predetermined timing near the last-stage SOI" is, for example, the crank angle that is set within a range of the late stage of the compression stroke and is, for example, a predetermined value that is set within a range of −35 [° C. A] or more and −15 [° C. A] or less after the compression TDC. The value of the last-stage SOI may be used for the "predetermined timing near the last-stage SOI".

In addition, based on the IVC state quantity, the second injection amount, and the like, the preignition limit calculation unit 105*f* calculates the molar fraction YF of each substance, and substitutes each of the calculated values into formula (2). Each molar fraction YF is calculated based on some of the second injection amounts (compression stroke injection) excluding the last-stage injection amount in the first interval In1 and calculated based on the sum of the second injection amounts including the last-stage injection amount in the second interval In2.

With the substitution of these parameters completed, the above formula (1) becomes a model formula that associates the last-stage SOI (SOI) with the LW value. FIG. 9 shows a graph of the time integral according to the present embodiment. This graph shows the behavior of the time integral of the inverse of the ignition delays τ1, τ2 when the model of formulae (1) and (2) are employed. A value on the vertical axis at the LW value determination timing Ti2 indicates the magnitude of the LW value represented by formula (1).

Of the first interval In1 and second interval In2 set within the compression stroke, the second interval In2 is closer to the compression TDC than the first interval In1 is. Thus, the in-cylinder pressure P and the in-cylinder temperature T in the second interval In2 are higher than those in the first interval In1. This acts to make the slope of the LW value in the second interval In2 (=1/τ2) steeper than the slope of the LW value in the first interval In1 (=1/τ1).

In addition, the molar fraction $YF_{Fuel}$ of the fuel in the second interval In2 is larger than the mole fraction $YF_{Fuel}$ of the fuel in the first interval In1 by including the fuel injected in the last-stage SOI. This also acts to make the slope of the LW value in the second interval In2 (=1/τ2) steeper than the slope of the LW value in the first interval In1 (=1/τ1).

Thus, the slope of the LW value in the second interval In2 is larger than the slope of the LW value in the first interval In1. Therefore, as shown in the upper graph (SOI: advance) in FIG. 9, as the last-stage SOI (SOI) is more advanced toward the first injection timing Ti1, the first interval In1 decreases, and the second interval In2 increases correspondingly. As a result of the difference in the slope between the intervals, the value of the time integral (LW value) at the LW value determination timing Ti2 increases.

On the other hand, as shown in the lower graph (SOI: retard) in FIG. 9, as the last-stage SOI (SOI) is brought closer to the LW value determination timing Ti2, the first interval In1 increases, and the second interval In2 decreases correspondingly. As a result, the value of the time integral (LW value) at the LW value determination timing Ti2 decreases.

The relationship between the last-stage SOI (SOI) and the LW value is consistent with the knowledge that more advancing the last-stage SOI makes preignition more likely to occur. Depending on the setting of the last-stage SOI (SOI), the LW value may exceed the LW limit value $LW_{limit}$.

Here, the LW value represented by formula (1) can be regarded as a function that takes the last-stage SOI (SOI) as an argument. This function is graphed in the graph shown in FIG. 10. This graph is obtained by graphing the model M54 representing changes in the LW value with respect to the last-stage SOI (SOI).

The preignition limit calculation unit 105*f* searches for an intersection point of the graph shown in FIG. 10 and the LW limit value $LW_{limit}$. This search may be performed, for example, by substituting the LW limit value $LW_{limit}$ into the left side of formula (1) and then solving formula (1) for the SOI.

Finally, the preignition limit calculation unit 105*f* sets the last-stage SOI (SOI) at the intersection point described above, that is, the advance limit that is the boundary where the LW value exceeds the LW limit value $LW_{limit}$ as the first limit line Li1.

The first limit line Li1 determined by the preignition limit calculation unit 105*f* is input to the advance limit determination unit 105*g*.

[6-5-7. Advance Limit Determination Unit]

The advance limit determination unit 105*g* reads the provisional last-stage SOI, the first limit line Li1, and the fifth limit line Li5, and selects and outputs the maximum value among these values. This output value is the final value of the last-stage SOI. Note that the "maximum value" here refers to the crank angle that is most retarded relative to the compression TDC in one combustion cycle.

For example, when a SOI base value is retarded relative to both the fifth limit line Li5 and the first limit line Li1, the advance limit determination unit 105*g* outputs the provisional last-stage SOI as the last-stage SOI. On the other hand, when the provisional last-stage SOI is retarded relative to the fifth limit line Li5, but is advanced relative to the first limit line Li1, the advance limit determination unit 105*g* outputs a value on the first limit line Li1 as the last-stage SOI.

[6-5-8. Calculation Timing]

The second injection calculation unit 105 starts these calculations at the second timing T2. The second injection calculation unit 105 inputs a signal indicating the SOI of the compression stroke injection (second SOI) including the last-stage SOI and a signal indicating the fuel injection amount in the compression stroke injection (second injection amount) to the second injection conversion unit 106.

(6-6. Second Injection Conversion Unit)

The second injection conversion unit 106 generates a drive current for the injector 6 based on the second SOI (including the last-stage SOI) and the second injection amount determined by the second injection calculation unit 105. The ECU 10 inputs the drive current generated by the second injection conversion unit 106 to the injector 6.

(6-7. Ignition Timing Calculation Unit)

FIG. 11 is a block diagram illustrating the configuration of the ignition timing calculation unit 107. The ignition timing calculation unit 107 is a functional block that determines a target value of the ignition timing of the first and second spark plugs 251, 252 as an example of the control parameter.

To determine the target value of the ignition timing, the ignition timing calculation unit 107 shown in FIG. 11 includes a target combustion gravity center setting unit 107*a*, a target combustion period determination unit 107*b*, an ignition timing conversion unit 107*c*, a transport limit calculation unit 107*d*, a smoke limit calculation unit 107*e*, and an advance limit determination unit 107*f*.

Note that a "combustion gravity center position" in the following description refers to the timing (crank angle) at which heat generation of 50% of the total amount of heat generation that occurs during one combustion cycle occurs. This combustion gravity center position can also be referred to as the timing (crank angle) at which 50% of the total injection amount during one combustion cycle is burned, that is, a mass fraction burned 50% (mfb50: mass fraction burned).

As is well known, the torque becomes maximum when the mfb50 is the so-called minimum advance for best torque (MBT) and gradually decreases as the mfb50 is retarded.

The ECU 10 is configured to adjust the ignition timing using this mfb50 as an indicator. More specifically, the ECU 10 determines the mfb50 in accordance with the operating state of the engine 1 and sets the target ignition timing based on a target position of the mfb50. That is, the ECU 10 determines the target ignition timing so that the first and second spark plugs 251, 252 perform forced ignition at a timing such that the target position of the mfb50 is achieved.

[6-7-1. Target Combustion Gravity Center Setting Unit]

The target combustion gravity center setting unit 107*a* includes a torque reduction calculation unit 1071, a knock limit calculation unit 1072, a retard limit calculation unit 1073, and a combustion gravity center selection unit 1074.

Torque Reduction Calculation Unit

When a torque reduction request is made, the torque reduction calculation unit 1071 determines a target position of the mfb50 based on a predetermined retard limit so that the mfb50 does not exceed the retard limit. More specifically, when a torque reduction request is made, the torque reduction calculation unit 1071 determines the target position of the mfb50 based on the retard limit.

For example, in an automobile equipped with an automatic transmission, the torque reduction request is a request to reduce the torque to the engine 1 when the automatic transmission is shifted up. In addition, the torque reduction request is a request to reduce the torque of the engine 1 when the driver sets the accelerator opening degree to zero. Furthermore, the torque reduction request is a request to reduce the torque of the engine 1 in response to the driver's steering operation or the like in order to change the acceleration acting on the automobile for the running stability of the automobile.

As described above, the position of the mfb50 is related to the ignition timing. Determining the target position of the mfb50 is consequently equivalent to determining the target value of the ignition timing.

Retarding the ignition timing so that the mfb50 is retarded can reduce the torque more promptly than reducing the amount of air by adjusting the opening degree of the throttle valve to reduce the torque.

Specifically, the torque reduction calculation unit 1071 determines the target position of the mfb50 based on the retard limit by checking the mode signal, the load and the speed of the engine 1 against a predefined torque reduction map M71. The target value of the mfb50 is determined based on a standard deviation $\sigma$ of the mfb50 and the retard limit so that the retard limit becomes $3\sigma$ of the mfb50.

Note that the various calculations related to the torque reduction calculation unit 1071 can employ, for example, methods described in Japanese Patent Laid-Open No. 2020-169594 and the like, and details thereof are thus omitted.

—Knock Limit Calculation Unit—

The knock limit calculation unit 1072 calculates a third limit line Li3 based on the operating state of the engine 1. The third limit line Li3 defines a lower limit value (advance limit) of the ignition timing. The third limit line Li3 indicates the limit value at which knocking is restrained.

That is, advancing the ignition timing too much may result in combustion noise caused by knocking. The ignition timing has an advance limit for restraining combustion noise. The magnitude of this combustion noise is characterized by a cylinder pressure level filtered (cplf), which is a combustion noise indicator. The applicant discloses a high correlation between the cplf and the mfb50 in the following published patent documents and the like. The cplf is a frequency spectrum of pressure changes inside the combustion chamber.

The knock limit calculation unit 1072 advances the mfb50 as far as possible without exceeding a limiting value of the cplf. The advance limit at this time is the limit value corresponding to the third limit line Li3 described above.

Specifically, the knock limit calculation unit 1072 first sets the limiting value of the cplf based on the load, the speed, and the like of the engine 1. The knock limit calculation unit 1072 also sets a target cplf such that the above-mentioned limiting value is not exceeded, taking into consideration variations in the cplf caused by combustion of the air-fuel mixture.

Then, the knock limit calculation unit 1072 calculates the target position of the mfb50 at the advance limit by checking the load and the speed of the engine 1, and the target cplf against a predetermined knock limit map M72.

As described above, the position of the mfb50 is related to the ignition timing. Determining the target position of the mfb50 at the advance limit is consequently equivalent to determining the third limit line Li3 indicating the advance limit of the ignition timing.

Note that the various calculations related to the target cplf in the knock limit calculation unit 1072 can employ, for example, methods described in Japanese Patent Laid-Open No. 2020-112095 and the like, and details thereof are thus omitted. The knock limit calculation unit 1072 can also refer to the RON estimated value when setting the third limit line Li3. For example, as the RON estimated value increases, the third limit line Li3 shifts to the advanced side (shifts in the direction for allowing the ignition timing to advance).

—Retard Limit Calculation Unit—

The retard limit calculation unit 1073 calculates a fourth limit line Li4 based on the operating state of the engine 1. The fourth limit line Li4 defines an upper limit value (retard limit) of the ignition timing. The fourth limit line Li4 indicates the limit value at which the combustion stability is ensured. The fourth limit line Li4 can also be regarded as the limit value at which misfire is restrained.

That is, when the ignition timing is retarded too much, CI combustion in SPCCI combustion does not occur, or the stability of the SI combustion part in retard SI combustion and SPCCI combustion is reduced. The ignition timing has a retard limit for ensuring the combustion stability.

Thus, the retard limit calculation unit 1073 calculates a target position of the mfb50 at the retard limit by checking the load and the speed of the engine 1 against a predetermined retard limit map M73.

As described above, the position of the mfb50 is related to the ignition timing. Determining the position of the mfb50 at the retard limit is consequently equivalent to determining the fourth limit line Li4 indicating the retard limit of the ignition timing.

The retard limit map M73 defines the relationship between the load and the speed of the engine 1 and the position of the mfb50 at the retard limit. As the speed of the engine 1 decreases and the load of the engine 1 increases (that is, the charging efficiency increases), the fuel amount increases and the combustion stability increases, and, in addition, the time between ignition and combustion is long even if the ignition timing is retarded, which makes it possible to restrain misfire and the like. As the speed of the engine 1 decreases and the load of the engine 1 increases, the ignition timing can be more largely retarded. The position of the mfb50 at the retard limit is more retarded as the speed of the engine 1 decreases and the load of the engine 1 increases and is more advanced as the engine speed increases and the load decreases (that is, the charging efficiency decreases).

Note that the various calculations related to the retard limit calculation unit 1073 can employ, for example, methods described in Japanese Patent Laid-Open No. 2018-84181, Japanese Patent Laid-Open No. 2020-16197, and the like, and details thereof are thus omitted.

—Combustion Gravity Center Selection Unit—

The combustion gravity center selection unit 1074 selects any one of the positions of the mfb50 calculated by the torque reduction calculation unit 1071, the knock limit calculation unit 1072, and the retard limit calculation unit 1073.

For example, when a torque reduction request is made, the combustion gravity center selection unit 1074 selects the position of the mfb50 calculated by the torque reduction calculation unit 1071 and sets this as the target mfb50.

On the other hand, when no torque reduction request is made, the combustion gravity center selection unit 1074 selects the mfb50 position calculated by the knock limit calculation unit 1072 as long as it is on the advanced side relative to the mfb50 position calculated by the retard limit calculation unit 1073. The combustion gravity center selection unit 1074 sets the mfb50 position calculated by the knock limit calculation unit 1072 as the target mfb50.

In addition, when the mfb50 position calculated by the knock limit calculation unit 1072 shifts to the retarded side relative to the mfb50 position calculated by the retard limit calculation unit 1073, the combustion gravity center selection unit 1074 selects the mfb50 position calculated by the retard limit calculation unit 1073. The combustion gravity center selection unit 1074 sets the mfb50 position calculated by the retard limit calculation unit 1073 as the target mfb50.

[6-7-2. Target Combustion Period Determination Unit]

The target combustion period determination unit **107*b* includes a base period calculation unit 1075, and a base period correction unit 1076**.

Note that a "combustion period" in the following description refers to the period from the timing (crank angle) at which heat generation of 10% of the total amount of heat generation that occurs during one combustion cycle occurs to the timing (crank angle) at which heat generation of 50% thereof occurs. This combustion period is equal to a period obtained by subtracting a mass fraction burned 10% (mfb10) from the mfb50 in one combustion cycle. Hereinbelow, this period is denoted as the "mfb1050".

As is well known, the mfb1050 changes in accordance with the ignition timing of the fuel. In other words, in accordance with a target mfb1050, the ignition timing that achieves the target changes.

Thus, the ECU 10 is configured to adjust the ignition timing using this mfb1050 as an indicator. Specifically, the ECU10 determines the mfb1050 in accordance with the operating state of the engine 1 and sets the target ignition timing based on the target mfb1050. That is, the ECU 10 determines the target ignition timing at a timing that enables the target mfb1050 to be achieved in addition to the target mfb50 position.

—Base Period Calculation Unit—

The base period calculation unit 1075 calculates a base value (base period) of the mfb1050 by checking the mode signal, and the load and the speed of the engine 1 against a base period estimation map M74 or by substituting them into a base period estimation model (not shown).

For example, when all the parameters other than the injection mode are the same, the CI combustion has a shorter combustion period than the SI combustion. Thus, the SPCCI combustion has a shorter combustion period than the retard SI combustion. The base period described above increases or decreases depending on the injection mode.

In addition, the base period calculation unit 1075 estimates a shorter base period as the speed of the engine 1 increases. This is because, basically, as the speed of the engine 1 increases, the flame propagation speed increases, and the combustion of the air-fuel mixture abruptly progresses.

In addition, the base period calculation unit 1075 estimates a longer base period as the load of the engine 1 increases. This is because, basically, as the fuel injection amount increases, the time required for the combustion of the fuel increases.

—Base Period Correction Unit—

The base period correction unit 1076 determines a target value of the mfb1050 by performing various corrections, such as a correction in accordance with the split ratio of the retard SI, on the base period calculated by the base period calculation unit 1075.

The corrections performed by the base period correction unit 1076 include corrections based on the external EGR rate, a target equivalent ratio, and the above-mentioned split ratio. For example, as the external EGR rate increases, the fuel is diluted by a larger amount of gas, which increases the combustion period. On the other hand, as the target equivalent ratio decreases, the fuel is diluted by a larger amount of air, which increases the combustion period.

The base period correction unit 1076 outputs the base period with the above-mentioned corrections applied as the target mfb1050.

[6-7-3. Ignition Timing Conversion Unit]

The ignition timing conversion unit 107*c* converts the target mfb50 and the target mfb1050 to a base value (base timing) of the ignition timing by substituting the target mfb50 and the target mfb1050 into an ignition timing conversion model M75.

When the value of the target mfb1050 is fixed, it is necessary to more retard the ignition timing as the target mfb50 is more retarded. Similarly, when the value of the target mfb50 is fixed, it is necessary to more advance the ignition timing as the target mfb1050 becomes longer.

The ignition timing conversion model M75 is a model that formulates these tendencies, and, by substituting the target mfb50 and the target mfb1050, the base timing corresponding to these target values can be calculated.

The base timing obtained by the ignition timing conversion unit 107*c* is input to the advance limit determination unit 107*f*.

[6-7-4. Transport Limit Calculation Unit]

The transport limit calculation unit 107*d* calculates a sixth limit line Li6 based on the operating state of the engine 1. The sixth limit line Li6 defines a lower limit value (advance limit) of the ignition timing together with a second limit line Li2, which will be described further below. The sixth limit line Li6 indicates the limit value for allowing the fuel injected from the injector 6 to reach the first and second spark plugs 251, 252 through the cavity 31.

That is, when the ignition timing is excessively advanced, the ignition is performed with the piston 3 excessively lowered relative to the injector 6. In this case, the ignition may be performed before the air-fuel mixture generated by spray injected from the injector 6 sufficiently reaches the first and second spark plugs 251, 252. This may result in unstable ignition by the first and second spark plugs 251, 252. The unstable ignition may cause deterioration in the fuel efficiency and is thus unfavorable.

In addition, it is conceivable that the transport limit is also related to the retard limit of the last-stage SOI. That is, when the last-stage SOI is excessively retarded, the time interval between the end timing of the fuel injection and the ignition timing is shortened, and the arrival of the air-fuel mixture to the first and second spark plugs 251, 252 may become insufficient. This is considered to lead to unstable ignition as with the above reason.

On the other hand, the transport limit calculation unit 107*d* according to the present embodiment determines the sixth limit line Li6 as the advance limit of the ignition timing based on the engine speed, the last-stage SOI, the last-stage injection amount, and the fuel pressure.

For example, the transport limit calculation unit 107*d* shifts the sixth limit line Li6 to the advanced side relative to the compression TDC as the fuel pressure increases. This is because when the fuel pressure is high, it is easier for the fuel to reach the first and second spark plugs 251, 252 than when the fuel pressure is low, and setting the advance limit of the ignition timing to a more advanced side is thus allowed.

In addition, the transport limit calculation unit 107*d* shifts the sixth limit line Li6 to the advanced side relative to the compression TDC as the engine speed increases. Typically, when the engine speed is high, the time required to change the crank angle by 1° is shorter than that when the engine speed is low. Thus, at spraying from the injector 6, the piston 3 can be brought close to the injector 6 within a short time. Thus, when the engine speed is high, it is easier for the fuel to reach the first and second spark plugs 251, 252 than when the engine speed is low, and setting the advance limit of the ignition timing to a more advanced side is thus allowed.

In addition, the transport limit calculation unit 107*d* shifts the sixth limit line Li6 to the advanced side relative to the compression TDC as the last-stage SOI is more advanced. When the last-stage SOI is advanced, a longer time can be ensured to guide the fuel injected from the injector 6 to the first and second spark plugs 251, 252. Thus it becomes easier for the air-fuel mixture to reach the vicinity of the first and second spark plugs 251, 252, and setting the advance limit of the ignition timing to a more advanced side is thus allowed.

In addition, the transport limit calculation unit 107*d* shifts the sixth limit line Li6 to the retarded side relative to the compression TDC as the last-stage injection amount increases. When the last-stage injection amount is increased, the injection amount up to that point decreases in accordance with the split ratio, and the in-cylinder A/F excluding the contribution of the last-stage injection amount becomes lean. As a result, the sixth limit line Li6 is shifted to the retarded side.

In this manner, the transport limit calculation unit 107*d* determines the sixth limit line Li6 based on the engine speed, the last-stage SOI, the last-stage injection amount, and the fuel pressure. This determination can be performed, for example, by checking values of the engine speed, the last-stage SOI, the last-stage injection amount, and the fuel pressure against a transport limit map M76 that defines the sixth limit line Li6.

Here, the transport limit map M76 is a map that associates the values of the engine speed, the last-stage SOI, the last-stage injection amount, and the fuel pressure with a value of the sixth limit line Li6. The specific value of the sixth limit line Li6 is tuned in accordance with the geometric shape of the cavity 31 and the layout of the injector 6, the first spark plug 251, and second spark plug 252. The transport limit map M76 is previously stored in the memory 100*b*.

The sixth limit line Li6 determined by the transport limit calculation unit 107*d* is input to the advance limit determination unit 107*f*.

[6-7-5. Smoke Limit Calculation Unit]

The smoke limit calculation unit 107*e* calculates the second limit line Li2 based on the operating state of the engine 1. The second limit line Li2 defines the lower limit value (advance limit) of the ignition timing together with the sixth limit line Li6 described above. The second limit line Li2 indicates the limit value at which the occurrence of smoke is restrained.

That is, it is conceivable that, when the ignition timing is excessively advanced, the ignition starts before the fuel evaporates sufficiently, which may result in the occurrence of smoke. The occurrence of smoke is unfavorable in improving the fuel efficiency and the emission performance of the engine 1.

In addition, it is conceivable that the occurrence of smoke is also related to the retard limit of the last-stage SOI. That is, when the last-stage SOI is excessively retarded, the time interval between the end timing of the fuel injection and the ignition timing is shortened, which may result in insufficient fuel evaporation. This is considered to lead to the occurrence of smoke as with the above reason.

On the other hand, the smoke limit calculation unit 107*e* according to the present embodiment determines the second limit line Li2 as the advance limit of the ignition timing based on the last-stage injection amount, the fuel pressure, the last-stage SOI, the engine cooling water temperature, and various IVC state quantities as shown in FIGS. 11 and 12.

Specifically, the smoke limit calculation unit 107*e* includes an evaporation end timing estimation unit 1077, and a smoke limit inverse calculation unit 1078 as illustrated in FIGS. 11 and 12.

—Evaporation End Timing Estimation Unit—

The evaporation end timing estimation unit 1077 includes an injection period map M77, a crank angle conversion unit 1077*a*, a first addition unit 1077*b*, an evaporation period estimation unit 1077*c*, and a second addition unit 1077*d*.

The injection period map M77 calculates a fuel injection period (in particular, an injection period related to the last-stage injection amount) in units of time based on the last-stage injection amount and the fuel pressure. The crank angle conversion unit 1077*a* converts the calculated injection period to be represented in units of crank angle.

When this injection period is denoted as $T_{inj}$, and an end of injection timing (EOI) of the last-stage compression stroke injection is denoted as "last-stage EOI", the injection period $T_{inj}$ can be described as in the following formula (3).

$$T_{inj} = \text{last-stage } EOI - \text{last-stage } SOI \tag{3}$$

The first addition unit 1077*b* adds the last-stage SOI to the injection period $T_{inj}$ and outputs a result of the addition. As is apparent from formula (3), a value output by the first addition unit 1077*b* is nothing but a value of the last-stage EOI.

The evaporation period estimation unit 1077*c* estimates a period until the fuel injected up to the last-stage EOI evaporates (evaporation period) based on the fuel pressure, the engine cooling water temperature, and the IVC state quantity, and a map or a model.

The evaporation period estimation unit 1077*c* estimates the evaporation period using, for example, a model based on the evaporation speed of the fuel. In such estimation, a fuel droplet model can be used as described in, for example, Japanese Patent Laid-Open No. 2013-11176, International Publication No. WO 2012/046312, and the like.

When the evaporation period is denoted as $T_{eva}$, and an estimated value of an end of evaporation timing (EOE) indicating the timing when the fuel evaporation is completed is denoted as "EOE", the evaporation period $T_{eva}$ can be described as in the following formula (4).

$$T_{eva} = EOE - \text{last-stage } EOI \tag{4}$$

The second addition unit 1077*d* adds the last-stage EOI to the evaporation period $T_{eva}$ and outputs a result of the addition. As is apparent from formula (4), a value output by the second addition unit 1077*d* is nothing but a value of the EOE.

—Smoke Limit Inverse Calculation Unit—

The smoke limit inverse calculation unit 1078 includes a standby period map M78, and a third addition unit 1078*a*.

The standby period map M78 calculates a standby period, which will be described further below, based on the load and the speed of the engine 1. This standby period is the standby period between the end of evaporation of the fuel and the start of ignition. By setting the standby period to a value larger than zero, ignition can be started after reliably waiting for the end of evaporation of the fuel.

The standby period map M78 increases the standby period as the load of the engine 1 increases, and also increases the standby period as the speed of the engine 1 increases.

When this standby period is denoted as $T_{stb}$, and the advance limit of the ignition timing is denoted as IG, the standby period $T_{stb}$ can be described as in the following formula (5).

$$T_{stb} = IG - EOE \tag{5}$$

The third addition unit 1078*a* adds the EOE to the standby period $T_{stb}$ and outputs a result of the addition. As is apparent from the above formula (5), a value output by the third addition unit 1078*a* is nothing but a value of the IG.

The value of IG in Formula (5) is the advance limit of the ignition timing at which the restraint of smoke is guaranteed, and corresponds to the second limit line Li2 described above.

In this manner, the smoke limit inverse calculation unit 1078 outputs the second limit line Li2.

Note that, when factors other than the last-stage SOI, such as the fuel pressure, the load and the speed of the engine 1, the last-stage injection amount, and the engine cooling water temperature, are fixed, the value output by the third addition unit 1078*a* can be described as in formula (6).

$$IG = Con + \text{last-stage } SOI \tag{6}$$

In the above formula (6), Con is a parameter that depends on factors such as the fuel pressure, the load and the speed of the engine 1. When the factors other than the last-stage SOI are fixed as described above, Con becomes a constant term.

Taking into consideration that IG on the left side in the above formula (6) corresponds to the second limit line Li2, it can be understood that the advance limit for restraining smoke (=the second limit line Li2) is a linear function with slope=1, having the last-stage SOI as a variable. The second limit line Li2 is strongly correlated with the last-stage SOI.

[6-7-6. Advance Limit Determination Unit]

The advance limit determination unit **107*f* reads the base timing of the ignition timing, the sixth limit line Li6, and the second limit line Li2**, and selects and outputs the maximum value among these values. This output value is the final value of the ignition timing. Note that the "maximum value" here refers to the crank angle that is most retarded relative to the compression TDC in one combustion cycle.

For example, when the base timing is retarded relative to both the sixth limit line Li6 and the second limit line Li2, the advance limit determination unit **107*f* outputs the base timing as the ignition timing. On the other hand, when the base timing is retarded relative to the sixth limit line Li6, but is advanced relative to the second limit line Li2, the advance limit determination unit 107*f* outputs a value on the second limit line Li2** as the ignition timing.

[6-7-7. Calculation Timing]

The ignition timing calculation unit 107 executes these calculations continuously from the calculations of the second injection calculation unit 105 starting at the second timing T2. The ignition timing calculation unit 107 inputs a signal indicating the ignition timing to the first spark plug 251 and the second spark plug 252.

(6-8. F/B Term Calculation Unit)

The F/B term calculation unit 108 calculates the F/B term based on the current value of the last-stage SOI, the second limit line Li2, and the third limit line Li3 in order to execute feedback control related to the last-stage SOI.

Specifically, the F/B term calculation unit 108 searches for an intersection point of the current value of the last-stage SOI and the second limit line Li2, and determines the ignition timing on the second limit line Li2 corresponding to the current value of the last-stage SOI. Hereinbelow, the ignition timing on the second limit line Li2 is also referred to as the "smoke limit timing".

Similarly, the F/B term calculation unit 108 searches for an intersection point of the current value of the last-stage SOI and the third limit line Li3, and converts the intersection point (mfb50) to the ignition timing. The F/B term calculation unit 108 determines the ignition timing on the third limit line Li3 corresponding to the current value of the last-stage SOI. Hereinbelow, the ignition timing on the third limit line Li3 is also referred to as the "knock limit timing".

Then, the F/B term calculation unit 108 compares the smoke limit timing with the knock limit timing. The F/B term calculation unit 108 determines the F/B term based on a result of the comparison. The sign of the F/B term is illustrated in FIG. 13.

Specifically, when the smoke limit timing is larger than the knock limit timing, the F/B term calculation unit 108 sets the F/B term to a predetermined negative value. This setting corresponds to shifting the last-stage SOI in the advance direction.

In addition, when the smoke limit timing is smaller than the knock limit timing, the F/B term calculation unit 108 sets the F/B term to a predetermined positive value. This setting corresponds to shifting the last-stage SOI in the retard direction.

In addition, when the smoke limit timing is equal to the knock limit timing, the F/B term calculation unit 108 sets the F/B term to zero. This setting corresponds to not shifting the last-stage SOI any further.

7. Basic Concept Related to Parameter Map

As described above with reference to FIGS. 6 to 12, the ECU 10 according to the present embodiment determines the combination of the last-stage SOI (hereinbelow, also simply referred to as the "injection timing") and the ignition timing corresponding to the last-stage SOI.

Such determination of the ECU 10 corresponds to a step of selecting the combination of the injection timing and the ignition timing, corresponding to a selection on a parameter map $M_{lim}$ having the injection timing as a first axis and the ignition timing as a second axis. Hereinbelow, the combination of the injection timing and the ignition timing may be referred to as the "control parameter" as described above or the "control point".

FIG. 14 illustrates a schematic diagram of the parameter map $M_{lim}$. FIG. 13 illustrates an example in which the compression TDC is the origin, the first axis is the x axis, and the second axis is the y axis.

On the parameter map $M_{lim}$, a plurality of limit lines that vary in accordance with the operating state of the engine 1 are provided. The plurality of limit lines are the first limit line Li1 to the sixth limit line Li6 described above.

That is, as described above, the injection timing has the first limit line Li1 indicating the advance limit corresponding to restraining preignition, and the fifth limit line Li5 indicating the advance limit corresponding to the cavity limit.

In the case of the example in FIG. 14, the first limit line Li1 is a straight line substantially parallel to the y axis (ignition timing). More specifically, the first limit line Li1 is a straight line that very slightly advances the injection timing in accordance with the advance of the ignition timing (that is, a straight line having a slight dependence on the ignition timing). This reflects the influence of the interval of the injection timing and ignition timing. An earlier ignition timing is advantageous, although only slightly, and further advancing is allowed. Each point on the first limit line Li1 is basically a negative value.

The fifth limit line Li5 is a straight line parallel to the y axis (ignition timing). More specifically, the fifth limit line Li5 is a straight line that maintains the injection timing constant in response to an increase or decrease in the ignition timing (that is, a straight line having no dependence on the ignition timing). Each point on the fifth limit line Li5 is a negative value.

Similarly, the ignition timing has the second limit line Li2 indicating the advance limit corresponding to restraining the occurrence of smoke, the third limit line Li3 indicating the advance limit corresponding to restraining the occurrence of knocking, the fourth limit line Li4 indicating the retard limit corresponding to ensuring the combustion stability, the sixth limit line Li6 indicating the advance limit corresponding to the transport limit.

Here, the third limit line Li3 and the fourth limit line Li4 are the advance limit and the retard limit that are indirectly incorporated into the determination of the ignition timing through the setting of the target mfb50.

In addition, as described above, at least the second limit line Li2 and the sixth limit line Li6 have a dependence not only on the ignition timing, but also on the injection timing (last-stage SOI).

In the case of the example in FIG. 14, the fourth limit line Li4 is a straight line substantially parallel to the x axis (injection timing). More specifically, the fourth limit line Li4 is a straight line that very slightly retards the ignition timing in accordance with the retard of the injection timing (that is, a straight line having a slight dependence on the injection timing). This reflects the influence of the interval of the injection timing and ignition timing. A later injection timing is advantageous, although only slightly, and further retarding is allowed. Each point on the fourth limit line Li4 is basically a positive value.

The second limit line Li2, the third limit line Li3, and the sixth limit line Li6 are straight lines having a dependence on the injection timing. In particular, the second limit line Li2 is a linear function with a slope=1, as represented in formula (6).

Among the first limit line Li1 to the sixth limit line Li6, at least the first limit line Li1 to the fourth limit line Li4 define a parameter region $R_{lim}$ surrounded by the first limit line Li1 to the fourth limit line Li4 on the parameter map $M_{lim}$.

The ECU 10 takes the first limit line Li1 to the fourth limit line Li4 into consideration when determining the control parameter. This is equivalent to selecting the combination of the injection timing and the ignition timing within the range of the parameter region $R_{lim}$.

Then, the ECU 10 according to the present embodiment selects the control parameter so that the ignition timing is at maximum advance within the range of the parameter region $R_{lim}$. Hereinbelow, this selection will be described with a conceptual example.

8. Specific Example of Process Related to Parameter Map

The following description will start from a state in which the ignition timing is at maximum advance within the range of the parameter region $R_{lim}$ as shown by a control point Pad in FIG. 14.

When the parameter region $R_{lim}$ is reduced or expanded, the ECU 10 executes at least one of feedback control and feedforward control for the injection timing, while executing feedforward control for the ignition timing. The feedforward control is a process that is executed before the air-fuel mixture is actually ignited in each combustion cycle. The feedback control is a process that is executed repeatedly and in stages each time the combustion cycle is repeated.

A situation in which, as shown in FIG. 15A, the third limit line Li3 corresponding to the knock limit has shifted to the retarded side (restraining combustion noise has been made difficult), for example, as a result of a reduction in the fuel pressure will be considered. In this case, since the F/B term is not calculated without going through the ignition timing calculation unit 107, the feedback control for the injection timing is not executed until the first combustion cycle after the shift is performed. In addition, since the magnitude relationship with the first limit line Li1 and the fifth limit line Li5 has not changed, the feedforward control for the injection timing is also not executed.

On the other hand, as a result of the shift of the third limit line Li3, the parameter region $R_{lim}$ is reduced. In response to this reduction, the ignition timing at the initial position of the control point Pad falls outside the range of the parameter region $R_{lim}$.

In this case, the knock limit calculation unit 1072 of the ignition timing calculation unit 107 shifts the ignition timing onto a shifted third limit line Li3A. This third limit line Li3A is located on the retarded side relative to the second limit line Li2 and the sixth limit line Li6, which eliminates the necessity of guard by both the limit lines. The process of shifting the ignition timing is feedforward control based on the operating state of the engine 1.

In the first combustion cycle after the reduction of the parameter region $R_{lim}$, only the ignition timing is shifted prior to igniting the air-fuel mixture (refer to a control point $P_{a1}$). The ECU10 causes the air-fuel mixture to burn with only the ignition timing shifted.

By shifting the ignition timing, information related to the third limit line Li3A and the second limit line Li2 used for the shift is fed back to the F/B term calculation unit 108.

The F/B term calculation unit 108 calculates the F/B term based on the fed-back information through the process described above with reference to FIG. 13. In the case of the example in FIG. 15A, the knock limit timing is larger than the smoke limit timing. Thus, the F/B term calculation unit 108 determines the F/B term in the direction of retarding the injection timing.

In the second combustion cycle after the shift, the injection timing shifts to the retarded side in response to the addition of the F/B term (refer to a control point $P_{a2}$). The process of shifting the injection timing is feedback control based on the operating state of the engine 1.

However, this control point Paz still has room for advance related to the knock limit. Thus, the knock limit calculation unit 1072 shifts the ignition timing onto the shifted third limit line Li3A. This shift is feedforward control as with the above.

The ECU 10 shifts the injection timing in stages each time the combustion cycle is repeated. This shift is feedback control based on the operating state of the engine 1. At this time, even if the injection timing passes a desired control point (the maximum advance point of the ignition timing), the magnitude relationship between the knock limit timing and the smoke limit timing is reversed. The F/B term calculation unit 108 reliably causes the injection timing to reach the desired control point by combining the addition of the F/B term in the direction of retarding the injection timing with the addition of the F/B term in the direction of advancing the injection timing.

By repeating the feedback control and the feedforward control in this manner, a control point $P_{a3}$ reaches an intersection point of the third limit line Li3A and the second limit line Li2. This intersection point is the control point where the knock limit timing and the smoke limit timing coincide with each other. Thus, the F/B term calculation unit 108 sets the F/B term to zero.

By setting the F/B term to zero, the feedback control for the injection timing is finished. Since the ignition timing is also located at the intersection point of the third limit line Li3A and the second limit line Li2, there is no room for further advance, and the feedforward control for the ignition timing is also finished.

The control point $P_{a3}$ thus reached corresponds to the maximum advance point of the ignition timing in a parameter region $R_{lim}$A after reduction.

In addition, a situation in which, as shown in FIG. 15B, the first limit line Li1 corresponding to preignition has shifted to the retarded side (restraining preignition has been made difficult), for example, as a result of a low-octane fuel being newly filled will be considered. In this case, since the F/B term is not calculated without going through the ignition timing calculation unit 107, the feedback control for the injection timing is not executed in the first combustion cycle after the shift. Although not shown in FIG. 15B, in this case, the third limit line Li3 is also shifted to the retarded side.

However, as a result of the shift of the first limit line Li1, the parameter region $R_{lim}$ is reduced. In response to this reduction, the injection timing at the initial position of the control point Pad is located on the advanced side relative to the first limit line Li1 and thus falls outside the range of the parameter region $R_{lim}$.

In this case, the preignition limit calculation unit 105*f* and the advance limit determination unit 105*g* of the second injection calculation unit 105 shift the injection timing onto a shifted first limit line Li1B (refer to a control point $P_{b1}$). This first limit line Li1B is located on the retarded side relative to the fifth limit line Li5 (not shown), which eliminates the necessity of guard by the fifth limit line Li5. This process is feedforward control based on the operating state of the engine 1.

In addition, the smoke limit calculation unit 107*e* and the advance limit determination unit 107*f* of the ignition timing calculation unit 107 shift the ignition timing onto the second limit line Li2. This second limit line Li2 is located on the retarded side relative to the third limit line Li3 and the sixth limit line Li6, which eliminates the necessity of guard by both the limit lines. The process of shifting the ignition timing is feedforward control based on the operating state of the engine 1.

In the first combustion cycle after the reduction of the parameter region $R_{lim}$, the injection timing and the ignition timing are shifted prior to igniting the air-fuel mixture (refer to a control point $P_{b2}$). The ECU10 causes the air-fuel mixture to burn with the injection timing and the ignition timing shifted.

By shifting the ignition timing, information related to the third limit line Li3 and the second limit line Li2 used for the shift is fed back to the F/B term calculation unit 108.

The F/B term calculation unit 108 calculates the F/B term based on the fed-back information through the process described above with reference to FIG. 13. In the case of the example in FIG. 15B, the knock limit timing is smaller than the smoke limit timing. Thus, the F/B term calculation unit 108 determines the F/B term in the direction of advancing the injection timing.

In the second combustion cycle after the shift, although the F/B term is added to the injection timing, the shifted first limit line Li1B serves as a guard, and the injection timing thus shifts onto the first limit line Li1B by feedforward control. In response to the shift of the injection timing, the ignition timing shifts onto the second limit line Li2. The control point $P_{b3}$, which is finally selected by repeating such a process, is nothing but the maximum advance point of the ignition timing in the parameter region $R_{lim}$B after reduction.

In this manner, the ECU 10 guides the control point $P_{b3}$ to the maximum advance point of the ignition timing in the parameter region $R_{lim}$B by executing at least the feedforward control.

In addition, a situation in which, as shown in FIG. 15C, each of the first limit line Li1 and the third limit line Li3 has shifted to the advanced side, for example, as a result of the engine being cold and a low-octane fuel being newly filled will be considered. In this case, since the F/B term is not calculated without going through the ignition timing calculation unit 107, feedback control for the injection timing is not executed in the first combustion cycle after the shift. In addition, since the magnitude relationship with the first limit line Li1 and the fifth limit line Li5 has not changed, feedforward control for the injection timing is also not executed.

On the other hand, as a result of the shift of the first limit line Li1 and the third limit line Li3 to the advanced side, the parameter region $R_{lim}$ is expanded. In response to this expansion, the ignition timing at the initial position of the control point Pad is brought to non-maximum advance although it is within the range of the parameter region $R_{lim}$.

In this case, since the ignition timing is also located on the second limit line Li2, feedforward control for the ignition timing is also not executed.

However, information related to the third limit line Li3A and the second limit line Li2 used to determine whether feedforward control is necessary is fed back to the F/B term calculation unit 108.

The F/B term calculation unit 108 calculates the F/B term based on the fed-back information through the process described above with reference to FIG. 13. In the case of the example in FIG. 15C, the knock limit timing is smaller than the smoke limit timing. Thus, the F/B term calculation unit 108 determines the F/B term in the direction of advancing the injection timing.

In the second combustion cycle after the shift, in response to the addition of the F/B term, the injection timing shifts to the advanced side (refer to a control point $P_{c1}$). The process of shifting the injection timing is feedback control based on the operating state of the engine 1.

However, this control point $P_{c1}$ still has room for advance related to the knock limit. Thus, the knock limit calculation unit 1072 shifts the ignition timing onto a shifted third limit line Li3C. This shift is feedforward control for the ignition timing.

The ECU 10 shifts the injection timing in stages each time the combustion cycle is repeated. This shift is feedback control based on the operating state of the engine 1. At this time, even if the injection timing passes a desired control point (the maximum advance point of the ignition timing), the magnitude relationship between the knock limit timing and the smoke limit timing is reversed. The F/B term calculation unit 108 reliably causes the injection timing to reach the desired control point by combining the addition of the F/B term in the direction of retarding the injection timing and the addition of the F/B term in the direction of advancing the injection timing.

By repeating the feedback control and the feedforward control in this manner, a control point $P_{c2}$ reaches an intersection point of the third limit line Li3C and the second limit line Li2. This intersection point is the control point where the knock limit timing and the smoke limit timing coincide with each other. Thus, the F/B term calculation unit 108 sets the F/B term to zero.

By setting the F/B term to zero, the feedback control for the injection timing is finished. Since the ignition timing is also located at the intersection point of the third limit line Li3C and the second limit line Li2, there is no room for further advance, and the feedforward control of the ignition timing is also finished.

The control point $P_{c2}$ thus reached corresponds to the maximum advance point of the ignition timing in the parameter region $R_{lim}$C after expansion.

FIG. 16 is a flowchart illustrating a process relating to the movement of the control point. First, in step S1, the ECU 10 sets a base value of the control point of the engine 1. This control point is the combination of the last-stage SOI and the ignition timing as described above, and is set based on the operating state of the engine 1.

In parallel with, or before or after step S101, the ECU 10 determines the parameter region $R_{lim}$ based on the operating environment, such as changes in the engine cooling water temperature, changes in the octane number, transition between cold operation and warm operation, and the operating state of the engine 1, such as the speed and the load (step S102).

In the subsequent step S103, the ECU 10 determines whether the control point is within the parameter region $R_{lim}$. As described above with reference to FIGS. 6 to 12, the determination of whether the last-stage SOI is within the parameter region $R_{lim}$ and the determination of whether the ignition timing is within the parameter region $R_{lim}$ may be performed individually and continuously.

When the determination of step S103 is YES, the ECU 10 advances the control process to step S105. When the determination of step S103 is NO, the ECU 10 advances the control process to step S104.

In step S104, the ECU 10 shifts the control point onto the limit line by using the advance limit determination unit 105*g* for the last-stage SOI, the advance limit determination unit 107*f* for the ignition timing, and the like. For example, when the ignition timing is on the advanced side relative to the second limit line Li2, the ECU 10 shifts the ignition timing onto the second limit line Li2. The process of step S104 is feedforward control that is performed prior to igniting the air-fuel mixture in one combustion cycle.

As described above with reference to FIG. 15B, the feedforward control of step S104 is also performed on the last-stage SOI. After the process of step S104 is completed, the ECU 10 advances the control process to step S105.

In step S105, the ECU 10 determines whether the ignition timing is at maximum advance (ignition maximum advance) within the parameter region $R_{lim}$. When this determination is YES, the ECU 10 finishes the control process shown in FIG. 16. When the determination of step S105 is NO, the ECU 10 advances the control process to step S106.

In step S106, the ECU 10 shifts the last-stage SOI and the ignition timing toward the ignition maximum advance. For the last-stage SOI, feedback control that is set based on the magnitude relationship between the second limit line Li2 and the third limit line Li3 to shift the last-stage SOI in stages toward the intersection point of the two lines is performed. This feedback control is performed in each combustion cycle each time the combustion cycle is repeated.

On the other hand, in step S106, for the ignition timing, feedforward control to shift the ignition timing onto the second limit line Li2 or the third limit line Li3 is performed. That is, each time the last-stage SOI is shifted in stages, the ignition timing moves away from the second limit line Li2 or the third limit line Li3. By performing the feedforward control each time, it is possible to maintain the ignition timing on the second limit line Li2 or the third limit line Li3.

9. Conclusion

As described above, according to the above embodiment, the control point consisting of the combination of the injection timing and the above-mentioned ignition timing is determined within the parameter region $R_{lim}$ defined by the plurality of limit lines. This makes it possible to perform setting within the range of various restrictions when selecting the injection timing and the ignition timing.

Furthermore, by bringing the ignition timing to maxim advance within the parameter region $R_{lim}$, the fuel efficiency of the engine 1 can be optimized while taking into consideration the various restrictions imposed on the engine 1.

In addition, even when the control point Pad falls outside the parameter region as illustrated in FIGS. 15A and 15B, the control point is shifted to any one of the limit lines, such as the third limit line Li3A or the first limit line Li1B. This makes it possible to respond to the restrictions imposed on the engine 1 in a preferential manner. Then, each process can be performed in accordance with the desired order of priority by bringing the ignition timing to maximum advance in stages.

As illustrated in FIGS. 15A and 15B, within one combustion cycle, the control point Pad is shifted to the limit line such as the third limit line Li3A or the first limit line Li1B. This makes it possible to respond as quickly as possible to the restrictions imposed on the engine 1. In addition, the shift at this time may be a shift of the ignition timing as shown in FIG. 15A or a shift of the injection timing as shown in FIG. 15B.

In addition, as shown by each arrow in FIGS. 15A to 15C, the ignition timing is brought to maximum advance in stages for each combustion cycle. By changing the ignition timing in stages, the ignition timing can be more reliably shifted to the maximum advance point.

In addition, as shown in FIG. 8, as one of the plurality of limit lines, the fifth limit line Li5 indicating the advance limit for allowing the fuel injected from the injector 6 to reach the inside of the cavity 31 is adopted. This makes it possible to impose restrictions on the engine 1 from a more multifaceted point of view. This is advantageous in improving the performance of the engine 1.

In addition, as shown in FIG. 11, as one of the plurality of limit lines, the sixth limit line Li6 indicating the advance limit for allowing the fuel injected from the injector to reach the first and second spark plugs 251, 252 is adopted. This makes it possible to impose restrictions on the engine 1 from a more multifaceted point of view. This is advantageous in improving the performance of the engine 1.

In addition, as shown in FIG. 11, the fourth limit line Li4 indicating the retard limit of the ignition timing is adopted in the plurality of limit lines. This makes it possible to impose restrictions from a more important point of view in the combustion control of the engine 1. This is advantageous in improving the performance of the engine 1.

10. Other Embodiments

In the above embodiment, the ECU 10 is configured to consequently perform a process equivalent to selecting the control point on the parameter map $M_{lim}$, although the ECU 10 does not actually store the parameter map $M_{lim}$, but the present disclosure is not limited to such a configuration. The ECU 10 may be configured to store and read the parameter map $M_{lim}$ and actually search for the control point on the parameter map $M_{lim}$.

REFERENCE SIGNS LIST

1 engine
10 ECU
108 F/B term calculation unit
11 cylinder
6 injector
251 first spark plug (spark plug)
252 second spark plug (spark plug)
L1 first limit line
L2 second limit line L3 third limit line
L4 fourth limit line
L5 fifth limit line
L6 sixth limit line
$M_{lim}$ parameter map
$R_{lim}$ parameter region

The invention claimed is:

1. A method for controlling an engine using a cylinder, an injector that injects fuel into the cylinder, a spark plug that ignites an air-fuel mixture containing the fuel injected from the injector, and a controller that is electrically connected to the injector and the spark plug and controls each of the injector and the spark plug, the method comprising:
selecting with the controller a control point consisting of a combination of an injection timing at which the injector injects the fuel and an ignition timing at which the spark plug ignites the air-fuel mixture, corresponding to a selection on a parameter map defined by a first axis of the injection timing and a second axis of the ignition timing that is orthogonal to the first axis of the injection timing, wherein
a plurality of limit lines are provided on the parameter map, each of the limit lines varying in accordance with an operating state of the engine,
the plurality of limit lines include
a first limit line indicating an advance limit of the injection timing for restraining preignition,
a second limit line indicating an advance limit of the ignition timing for restraining smoke,
a third limit line indicating an advance limit of the ignition timing for restraining knocking, and
a fourth limit line indicating a retard limit of the ignition timing for ensuring combustion stability, and
the plurality of limit lines define a parameter region surrounded by the plurality of limit lines on the parameter map; and
selecting with the controller the control point so that the ignition timing is brought to maximum advance within a range of the parameter region.

2. The method for controlling the engine according to claim 1, further comprising:
first shifting by the controller the control point onto any one of the limit lines constituting the parameter region when the control point falls outside the parameter region in response to a reduction of the parameter region; and
after the first shifting, second shifting by the controller the control point repeatedly each time a combustion cycle is repeated until the ignition timing is brought to maximum advance within a range of the parameter region after the reduction.

3. The method for controlling the engine according to claim 2, wherein
the first shifting includes shifting the control point onto any one of the limit lines within one combustion cycle through feedforward control based on the operating state of the engine.

4. The method for controlling the engine according to claim 1, further comprising:
shifting, by the controller, the control point in repeatedly each time a combustion cycle is repeated in response to the ignition timing being brought to non-maximum advance in response to an expansion of the parameter region, until the ignition timing is brought to maximum advance within a range of the parameter region after the expansion.

5. The method for controlling the engine according to claim 1, wherein
a piston is housed in the cylinder,
a cavity is formed on an upper face of the piston, and
the plurality of limit lines further include a fifth limit line indicating an advance limit of the injection timing for allowing the fuel injected from the injector to reach inside of the cavity.

6. The method for controlling the engine according to claim 1, wherein
the plurality of limit lines further include a sixth limit line indicating an advance limit of the ignition timing for allowing the fuel injected from the injector to reach the spark plug.

7. An engine control apparatus for controlling an engine including a cylinder, an injector that injects fuel into the cylinder, and a spark plug that ignites an air-fuel mixture containing the fuel injected from the injector, comprising:
circuitry configured to
select a control point consisting of a combination of an injection timing at which the injector injects the fuel and an ignition timing at which the spark plug ignites the air-fuel mixture, corresponding to a selection on a parameter map defined by a first axis of the injection timing and a second axis of the ignition timing that is orthogonal to the first axis of the injection timing, wherein
a plurality of limit lines are provided on the parameter map, each of the limit lines varying in accordance with an operating state of the engine,
the plurality of limit lines include
a first limit line indicating an advance limit of the injection timing for restraining preignition,
a second limit line indicating an advance limit of the ignition timing for restraining smoke,
a third limit line indicating an advance limit of the ignition timing for restraining knocking, and
a fourth limit line indicating a retard limit of the ignition timing for ensuring combustion stability, and
the plurality of limit lines define a parameter region surrounded by the plurality of limit lines on the parameter map; and
select the control point so that the ignition timing is brought to maximum advance within a range of the parameter region.

8. The engine control apparatus according to claim 7, wherein
the circuitry is further configured to
perform first shifting of the control point onto any one of the limit lines constituting the parameter region when the control point falls outside the parameter region in response to a reduction of the parameter region; and
after the first shifting, perform second shifting of the control point repeatedly each time a combustion cycle is repeated until the ignition timing is brought to maximum advance within a range of the parameter region after the reduction.

9. The engine control apparatus according to claim 8, wherein
the first shifting includes shifting the control point onto any one of the limit lines within one combustion cycle through feedforward control based on the operating state of the engine.

10. The engine control apparatus according to claim 7, wherein the circuitry is further configured to perform shifting of the control point repeatedly each time a combustion cycle is repeated in response to the ignition timing being brought to non-maximum advance in response to an expansion of the parameter region, until the ignition timing is brought to maximum advance within a range of the parameter region after the expansion.

11. The engine control apparatus according to claim 7, wherein a piston is housed in the cylinder, a cavity is formed on an upper face of the piston, and the plurality of limit lines further include a fifth limit line indicating an advance limit of the injection timing for allowing the fuel injected from the injector to reach inside of the cavity.

12. The engine control apparatus according to claim 7, wherein the plurality of limit lines further include a sixth limit line indicating an advance limit of the ignition timing for allowing the fuel injected from the injector to reach the spark plug.

* * * * *